(12) United States Patent
Chiba

(10) Patent No.: US 8,675,055 B2
(45) Date of Patent: Mar. 18, 2014

(54) SIGNAL PROCESSOR, SIGNAL PROCESSING METHOD, DISPLAY DEVICE AND PROGRAM PRODUCT

(75) Inventor: Nobutane Chiba, Kanagawa (JP)

(73) Assignee: Sony Corporation (JP)

(*) Notice: Subject to any disclaimer, the term of this patent is extended or adjusted under 35 U.S.C. 154(b) by 365 days.

(21) Appl. No.: 13/215,334

(22) Filed: Aug. 23, 2011

(65) Prior Publication Data

US 2012/0050276 A1    Mar. 1, 2012

(30) Foreign Application Priority Data

Aug. 30, 2010 (JP) ............................. P2010-192946

(51) Int. Cl.
*H04N 13/04* (2006.01)
*G06T 15/00* (2011.01)

(52) U.S. Cl.
USPC ............................................ 348/55; 345/419

(58) Field of Classification Search
USPC ............................................. 348/55; 345/419
See application file for complete search history.

(56) References Cited

U.S. PATENT DOCUMENTS

2006/0203085 A1* 9/2006 Tomita .............................. 348/51

FOREIGN PATENT DOCUMENTS

| JP | 10-271535 A | 10/1998 |
|---|---|---|
| JP | 2002-125245 A | 4/2002 |
| JP | 2007-318184 A | 12/2007 |

* cited by examiner

*Primary Examiner* — David Czekaj
*Assistant Examiner* — Tsion B Owens
(74) *Attorney, Agent, or Firm* — Lerner, David, Littenberg, Krumholz & Mentlik, LLP

(57) ABSTRACT

A signal processor includes: a phase matching section adapted to bring two image signals supplied from two cameras into phase, one image signal being a left image signal and the other image signal being a right image signal; a phase adjustment section adapted to change the horizontal phase of the left and/or right image signal based on a phase displacement so as to move both or either of the left and right images horizontally by a predetermined distance and output the image signals with changed parallax between the left and right images; and a read section adapted to output the left and/or right image signal in which, of those areas displayed three-dimensionally and other areas where only the left or right image is displayed two-dimensionally, the image in the two-dimensionally displayed areas has been replaced by an image different from that in the three-dimensionally displayed areas.

10 Claims, 22 Drawing Sheets

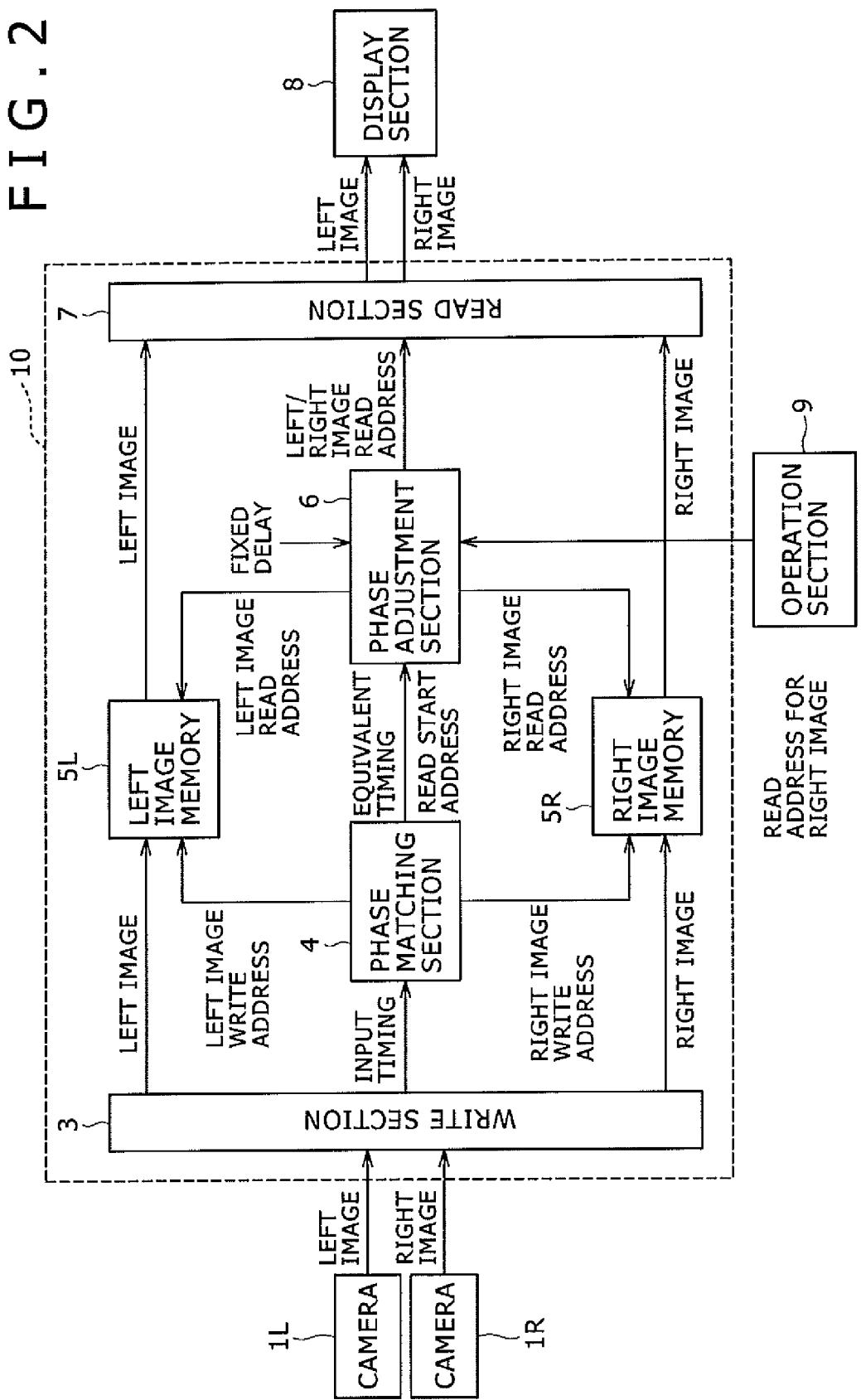

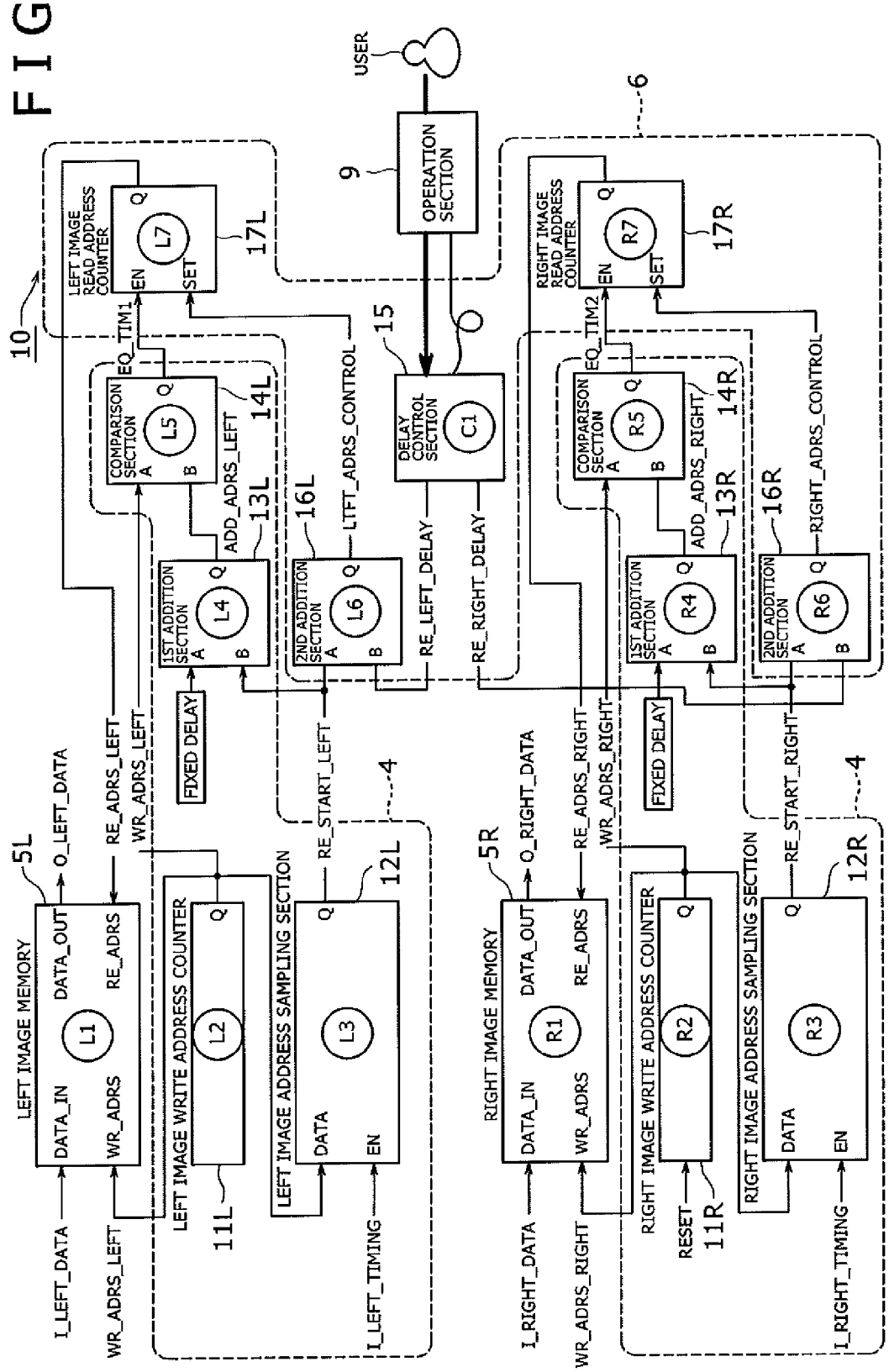

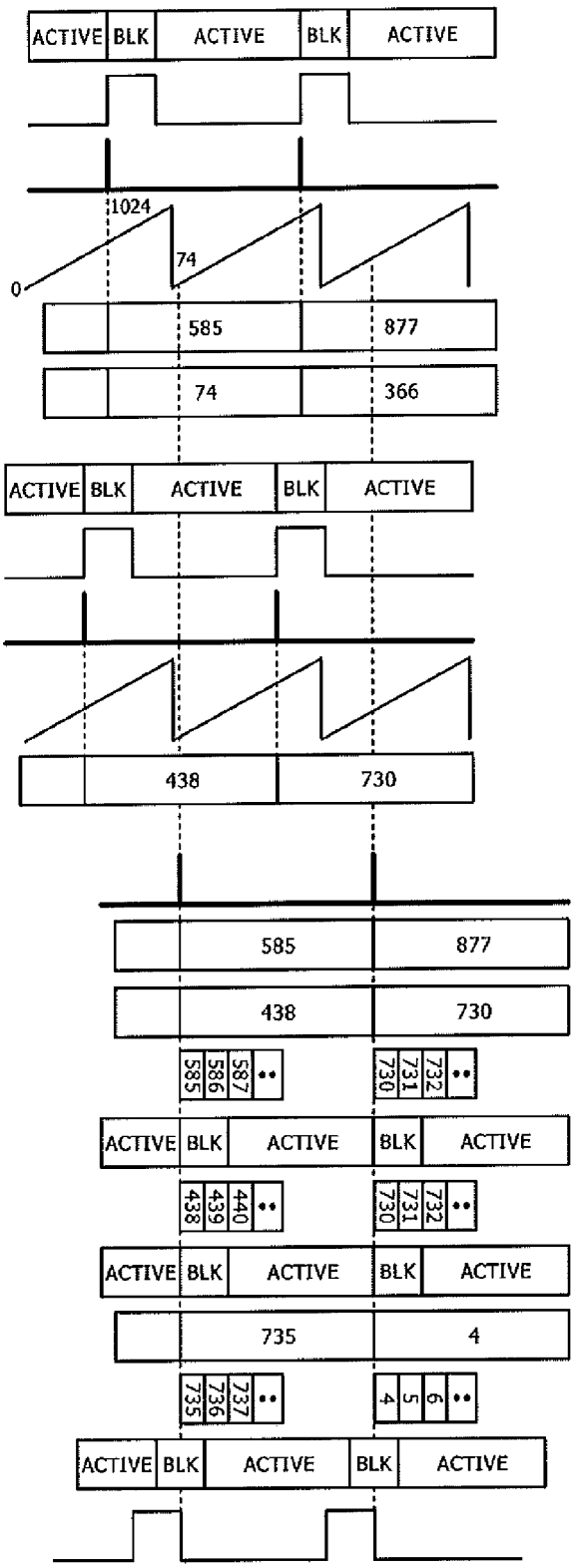

FIG. 4A  I_LEFT_DATA (LEFT IMAGE SIGNAL)
FIG. 4B  LEFT_HD (HORIZONTAL TIMING FOR LEFT IMAGE)
FIG. 4C  I_LEFT_TIMING (HORIZONTAL EDGE TIMING FOR LEFT IMAGE)
FIG. 4D  WR_ADRS_LEFT (WRITE ADDRESS FOR LEFT IMAGE)
FIG. 4E  RE_START_LEFT (READ START ADDRESS FOR LEFT IMAGE)
FIG. 4F  ADD_ADRS_LEFT (ADDITION ADDRESS FOR LEFT IMAGE)
FIG. 4G  I_RIGHT_DATA (RIGHT IMAGE SIGNAL)
FIG. 4H  RIGHT_HD (HORIZONTAL TIMING FOR RIGHT IMAGE)
FIG. 4I  I_RIGHT_TIMING (HORIZONTAL EDGE TIMING FOR RIGHT IMAGE)
FIG. 4J  WR_ADRS_RIGHT (WRITE ADDRESS FOR RIGHT IMAGE)
FIG. 4K  RE_START_RIGHT (READ START ADDRESS FOR RIGHT IMAGE)
FIG. 4L  EQ_TIM1 (EQUIVALENT TIMING)
FIG. 4M  LEFT_ADRS_CONTROL (CONTROL ADDRESS FOR LEFT IMAGE)
FIG. 4N  RIGHT_ADRS_CONTROL (CONTROL ADDRESS FOR RIGHT IMAGE)
FIG. 4O  RE_ADRS_LEFT (READ ADDRESS FOR LEFT IMAGE)
FIG. 4P  O_LEFT_DATA (LEFT IMAGE SIGNAL)
FIG. 4Q  RE_ADRS_RIGHT (READ ADDRESS FOR RIGHT IMAGE)
FIG. 4R  O_RIGHT_DATA (RIGHT IMAGE SIGNAL)
FIG. 4S  LEFT_ADRS_CONTROL (CONTROL ADDRESS FOR LEFT IMAGE)
FIG. 4T  RE_ADRS_LEFT (READ ADDRESS FOR LEFT IMAGE)
FIG. 4U  O_LEFT_DATA (LEFT IMAGE SIGNAL)
FIG. 4V  I_HD (MASK TIMING)

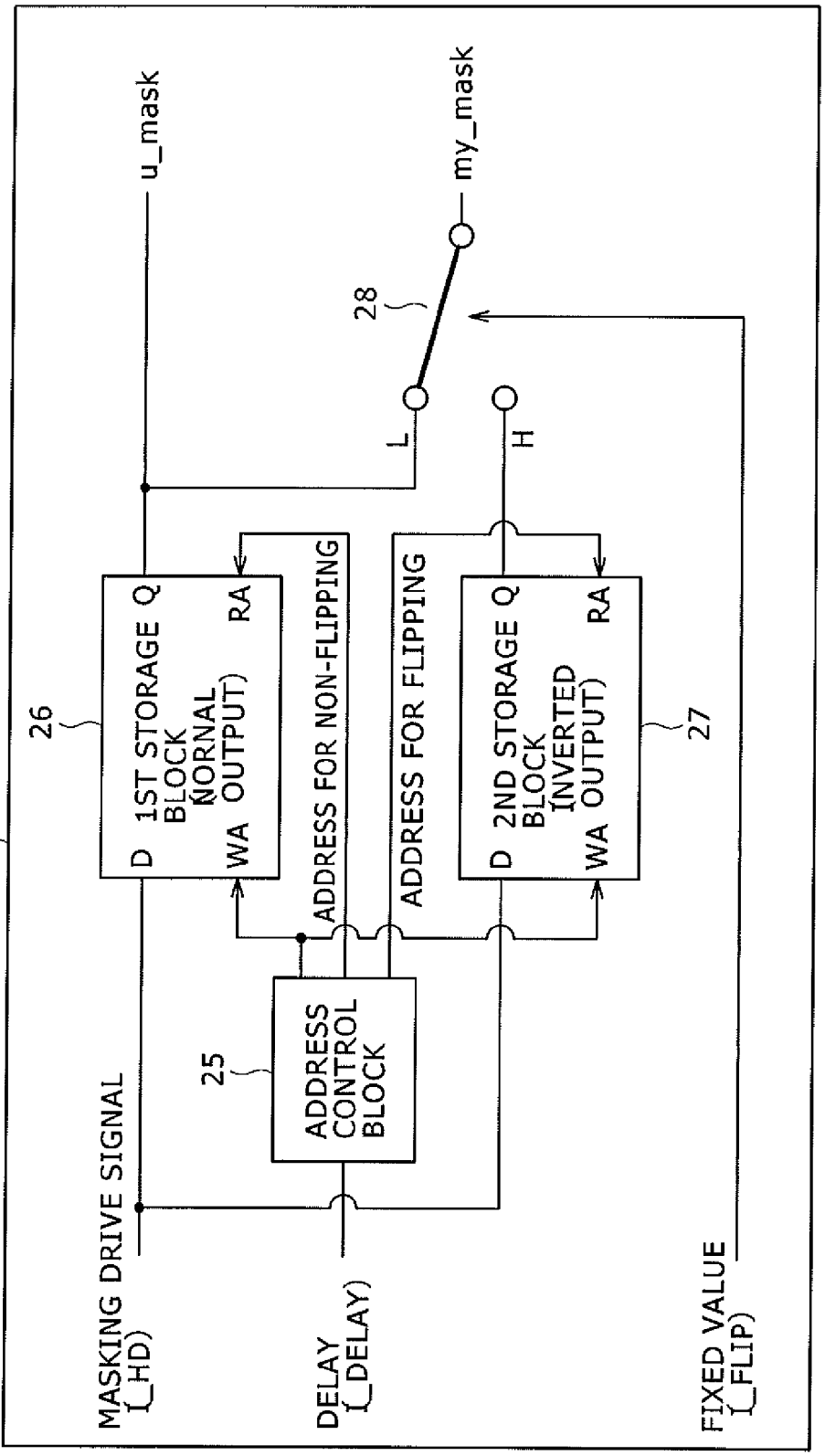

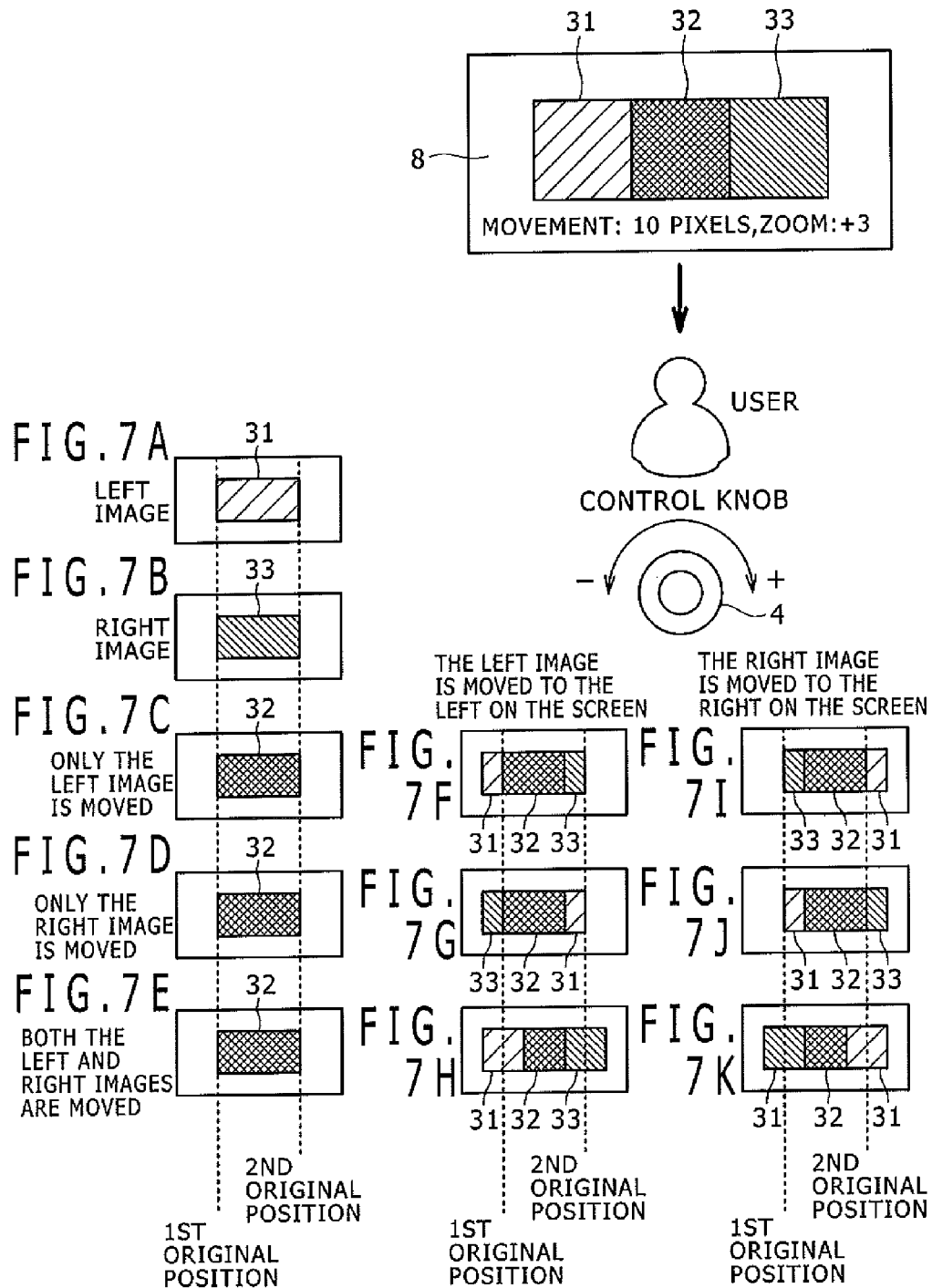

FIG.8A
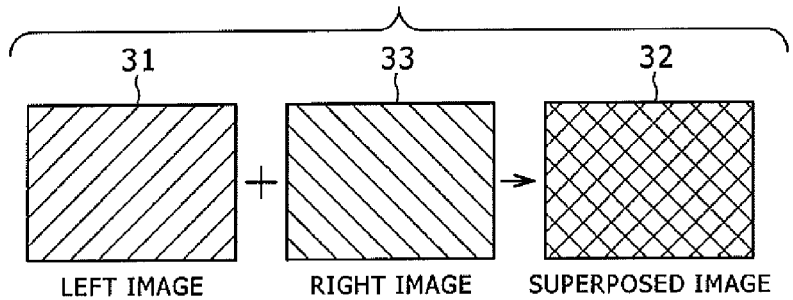
LEFT IMAGE    RIGHT IMAGE    SUPERPOSED IMAGE
FIG.8B
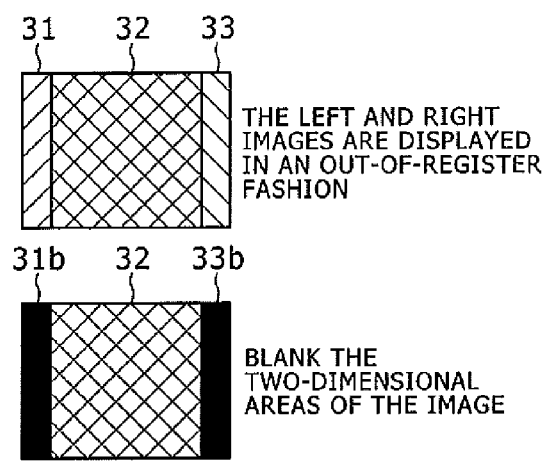
THE LEFT AND RIGHT IMAGES ARE DISPLAYED IN AN OUT-OF-REGISTER FASHION
FIG.8C
BLANK THE TWO-DIMENSIONAL AREAS OF THE IMAGE
FIG.8D
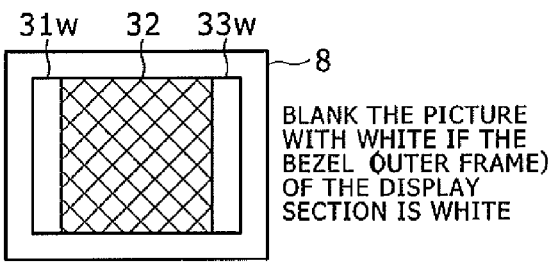
BLANK THE PICTURE WITH WHITE IF THE BEZEL (OUTER FRAME) OF THE DISPLAY SECTION IS WHITE
FIG.8E
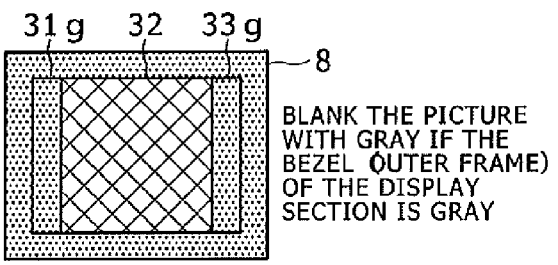
BLANK THE PICTURE WITH GRAY IF THE BEZEL (OUTER FRAME) OF THE DISPLAY SECTION IS GRAY

WHEN THE LEFT IMAGE SIGNAL (INPUT) IS IN PHASE WITH THE DISPLAY REGION

WHEN THE LEFT IMAGE SIGNAL (INPUT) IS LEADING

WHEN THE LEFT IMAGE SIGNAL (INPUT) IS LAGGING

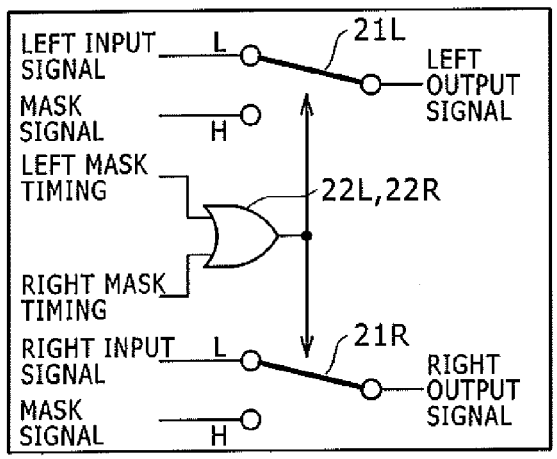
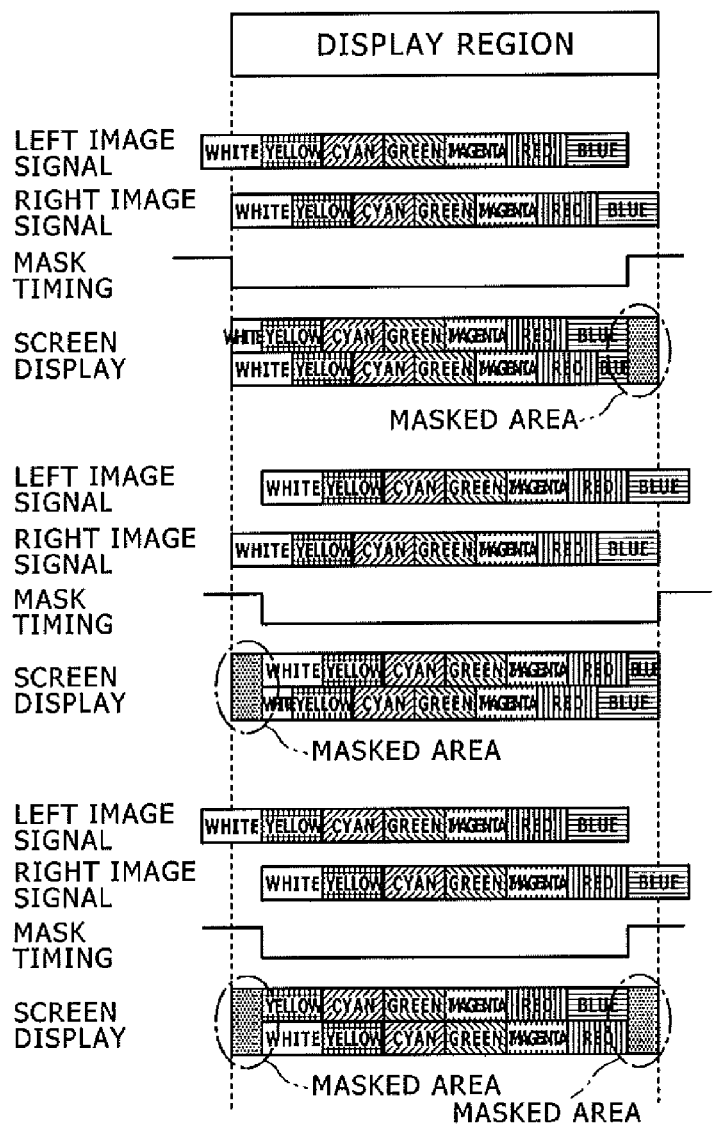

FIG.11A

WHEN THE LEFT IMAGE SIGNAL (INPUT) IS IN PHASE WITH THE DISPLAY REGION (THE SCREEN DISPLAY IS NOT FLIPPED IF THE INPUT IS FLIPPED)

DISPLAY REGION

LEFT IMAGE SIGNAL (INPUT) (FLIPPED INPUT) 

MASK TIMING

SCREEN DISPLAY 

FIG.11B

WHEN THE LEFT IMAGE SIGNAL (INPUT) IS LEADING

LEFT IMAGE SIGNAL (INPUT) 

MASK TIMING

SCREEN DISPLAY 

MASKED AREA

FIG.11C

WHEN THE LEFT IMAGE SIGNAL (INPUT) IS LAGGING

LEFT IMAGE SIGNAL (INPUT) 

MASK TIMING

SCREEN DISPLAY 

MASKED AREA

WHEN THE LEFT IMAGE SIGNAL (INPUT) IS FLIPPED AND LEADING (INCORRECT SCREEN)

WHEN THE LEFT IMAGE SIGNAL (INPUT) IS FLIPPED AND LEADING (CORRECT SCREEN)

TWO-DIMENSIONAL DISPLAY OF THE SAME IMAGE

THREE-DIMENSIONAL DISPLAY OF IMAGE

SIGNAL PROCESSOR, SIGNAL PROCESSING METHOD, DISPLAY DEVICE AND PROGRAM PRODUCT

CROSS-REFERENCE TO RELATED APPLICATION

The present application claims priority from Japanese Patent Application No. JP 2010-192946 filed in the Japanese Patent Office on Aug. 30, 2010, the entire content of which is incorporated herein by reference.

BACKGROUND

The present disclosure relates to a signal processor, signal processing method, display device and program product suitable, for example, for changing the parallax between images output from two cameras arranged to produce parallax by imaging the same subject.

In related art, a technique is available to produce a three-dimensional image that can be stereoscopically viewed by the user by using images of the same subject captured by two cameras arranged according to the parallax between the right and left eyes of the user. The two images captured by the two cameras are referred to as the left image and right image to match the left and right eyes of the user (the left image and right image will be hereinafter also referred to as the "left and right images"). Here, if there is a discrepancy in parameter settings such as tint, luminance and imaging position between the two cameras, a proper three-dimensional image may not be displayed. Therefore, the user manipulates the cameras to display the left and right images on two monitors or other display devices stacked one on top of another or arranged side by side and adjust the parameter settings while comparing the left and right images.

In order to produce a three-dimensional image and change the manner in which depth is added in related art, on the other hand, it is necessary to move the subject position where the left and right images are symmetrical. Then, the user has the images of the moved subject displayed on a three-dimensional monitor to verify whether depth is added as intended.

Japanese Patent Laid-Open No. 2002-125245 discloses a stereoscopic viewer operable to display the left and right images side by side and a technique operable to horizontally move images so as to set a position for stereoscopic viewing.

SUMMARY

Incidentally, when a three-dimensional image is captured, parallax is simulated with a three-dimensional monitor first. Then, the rigs to which the two cameras are attached to capture the left and right images are adjusted so as to adjust the mechanical parallax between the cameras. It is assumed here that the three-dimensional monitor is capable of displaying the left and right images that have horizontally moved by the same distance in the opposite directions. At this time, the user focuses his or her attention only on the subject to be changed. Therefore, the user stereoscopically views the subject on the three-dimensional monitor first to verify the effect of modification before actually modifying the data. Therefore, if the subject moves, it is necessary to adjust the camera positions by adjusting the rigs every time, thus resulting in a long shooting time.

On the other hand, when a three-dimensional image is edited, the left and right images are displayed in an overlapped manner on a three-dimensional monitor. At this time, there is a time when one wishes to move the left and right images out of register with each other, that is, move them out of phase with each other. Moving the two images out of phase results in areas free from overlaps or with less overlaps by the same amount as the misregistration. However, when the user verifies the images on the screen during editing, the difference in the manner in which the images overlap often makes the images extremely difficult to see. For example, the more the left and right images are moved out of register, the more areas in which the left and right images do not overlap, that is, the more areas that are difficult to see as a three-dimensional image. This results in a mixture of three- and two-dimensional images on the same screen, thus making the images extremely difficult for the user to see.

In light of the foregoing, it is desirable to facilitate the adjustment of the parallax between the left and right images.

The present disclosure brings two image signals, i.e., a left image signal stored in a left image memory and a right image signal stored in a right image memory, into phase. The left and right image signals are supplied from two cameras arranged according to the distance between the left and right human eyes and adapted to image the same subject.

Next, the horizontal phase of the left and/or right image signal is changed based on a phase displacement specified by an operation section.

Next, both or either of the left and right images displayed on a display section by the left and right image signals is moved horizontally by a predetermined distance, and the left and right image signals are output with changed parallax between the left and right images.

Then, the left and/or right image signal is output in which, of those areas displayed three-dimensionally thanks to the overlap of the left and right images with changed parallax and other areas where only the left or right image is displayed two-dimensionally, the image in the two-dimensionally displayed areas has been replaced by an image different from that in the three-dimensionally displayed areas.

This makes it possible to display the two-dimensionally displayed areas of the left and right images differently from the three-dimensionally displayed areas thereof if both or either of the left and right images displayed on the display section is moved by a predetermined distance.

A signal processing method includes: bringing two image signals supplied from two cameras arranged according to the distance between the left and right human eyes and adapted to image the same subject into phase one image signal being a left image signal stored in a left image memory, the other image signal being a right image signal stored in a right image memory; changing the horizontal phase of the left and/or right image signal based on a phase displacement specified by an operation section so as to move both or either of the left and right images displayed on a display section by the left and right image signals horizontally by a predetermined distance and output the left and right image signals with changed parallax between the left and right images; and outputting the left and/or right image signal in which, of those areas displayed on the display section three-dimensionally thanks or due to the overlap of the left and right images with changed parallax and other areas where only the left or right image is displayed on the display section two-dimensionally, the image in the two-dimensionally displayed areas has been replaced by an image different from that in the three-dimensionally displayed areas.

A display device includes: a phase matching section adapted to bring two image signals supplied from two cameras arranged according to the distance between the left and right human eyes and adapted to image the same subject into phase, one image signal being a left image signal stored in a left image memory, the other image signal being a right image signal stored in a right image memory; a display section adapted to display left and right images by the left and right image signals; a phase adjustment section adapted to change the horizontal phase of the left and/or right image signal based on a phase displacement specified by an operation section so as to move both or either of the left and right images horizontally by a predetermined distance and output the left and right image signals with changed parallax between the left and right images; and a read section adapted to output the left and/or right image signal in which, of those areas displayed on the display section three-dimensionally thanks or due to the overlap of the left and right images with changed parallax and other areas where only the left or right image is displayed on the display section two-dimensionally, the image in the two-dimensionally displayed areas has been replaced by an image different from that in the three-dimensionally displayed areas.

A program product causing a computer to: bring two image signals supplied from two cameras arranged according to the distance between the left and right human eyes and adapted to image the same subject into phase, one image signal being a left image signal stored in a left image memory, the other image signal being a right image signal stored in a right image memory; change the horizontal phase of the left and/or right image signal based on a phase displacement specified by an operation section so as to move both or either of the left and right images displayed on a display section by the left and right image signals horizontally by a predetermined distance and output the left and right image signals with changed parallax between the left and right images; and output the left and/or right image signal in which, of those areas displayed on the display section three-dimensionally thanks or due to the overlap of the left and right images with changed parallax and other areas where only the left or right image is displayed on the display section two-dimensionally, the image in the two-dimensionally displayed areas has been replaced by an image different from that in the three-dimensionally displayed areas.

The present disclosure horizontally moves both or either of the left and right images displayed on a display section by the left and right image signals by a predetermined distance and outputs the left and right image signals for the left and right images with changed parallax. This ensures that the areas free from image overlaps corresponding to the two-dimensionally displayed areas are not displayed and makes it easier to perceive only the three-dimensionally displayed areas, thus making it easier for the user to view a three-dimensional image. Further, although the size of three-dimensionally displayed areas corresponding to the image overlaps is reduced, the user views the overlaps of the left and right images, thus making the present disclosure practically beneficial. This allows for the user to easily verify the change in the stereoscopically viewed image resulting from the change in parallax by manipulating the operation section while at the same time watching the left and right images with changed parallax on the display section.

BRIEF DESCRIPTION OF THE DRAWINGS

FIG. 2 is a block diagram illustrating an internal configuration example of a signal processor according to the embodiment of the present disclosure;

FIG. 3 is a block diagram illustrating an internal configuration example of the signal processor according to the embodiment of the present disclosure;

FIGS. 4A to 4V are timing diagrams illustrating examples of processing timings of the signal processor according to the embodiment of the present disclosure;

FIG. 6 is a block diagram illustrating an internal configuration example of a timing generation unit according to the embodiment of the present disclosure;

FIGS. 7A to 7K are explanatory diagrams illustrating a phase displacement between left and right images according to the embodiment of the present disclosure;

FIGS. 8A to 8E are explanatory diagrams illustrating an example in which a three-dimensionally displayed area and two-dimensionally displayed areas are displayed differently according to the embodiment of the present disclosure;

FIGS. 10A to 10C are explanatory diagrams illustrating the procedure for masking the display of the two-dimensionally displayed areas using left and right image signals according to the embodiment of the present disclosure;

FIGS. 11A to 11C are explanatory diagrams illustrating an example in which the left image signal is flipped and input according to the embodiment of the present disclosure;

DETAILED DESCRIPTION OF THE PREFERRED EMBODIMENT

A description will be given below of the best mode for carrying out the present disclosure (hereinafter referred to as an embodiment). It should be noted that the description will be given in the following order.

1. First Embodiment (output control of the left and right image signals: example in which the phases of the left and right images are adjusted)

1. First Embodiment

Example in Which the Phases of the Left and Right Images are Adjusted

A description will be given below of an embodiment of the present disclosure with reference to the accompanying drawings. An example will be described in which the present disclosure is applied to a signal processor 10 adapted to change the phases of the left and right images and output the signals of these images and the signal processing method used by the same processor 10. It should be noted that, in the description given below, the present disclosure is applied to the signal processor 10 that is separate from a display section 8 serving as a three-dimensional monitor capable of displaying a three-dimensional image. However, the present disclosure is applicable to a display device incorporating the signal processor 10 and display section 8.

Figure 1A:
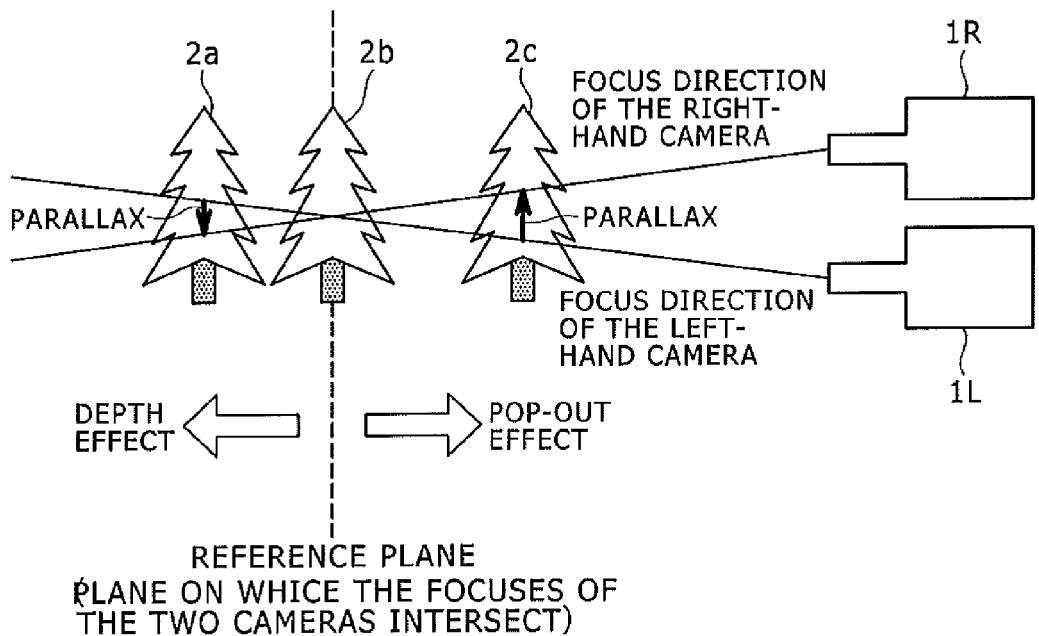
FIGS. 1A and 1B are configuration diagrams illustrating an example of arrangement of two cameras according to the distance between the left and right human eyes according to an embodiment of the present disclosure.
Figure 1B:
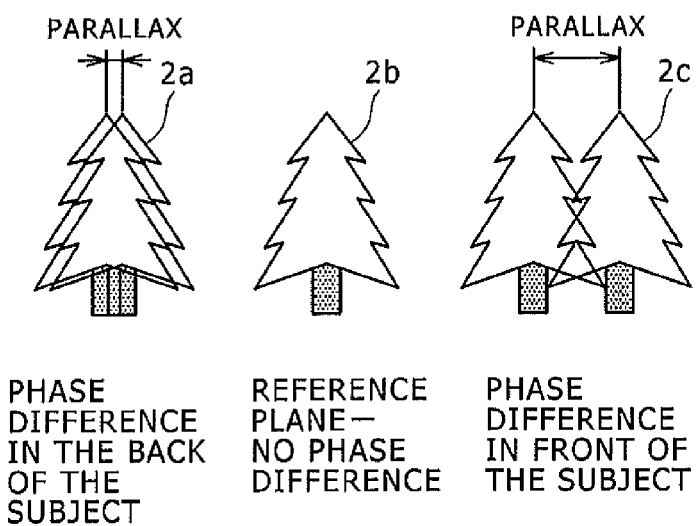

FIGS. 1A and 1B illustrate an example of arrangement of two cameras 1L and 1R according to the distance between the left and right human eyes. FIG. 1A illustrates an example of arrangement of the two cameras 1L and 1R. FIG. 1B illustrates an example of the difference in how subjects 2a to 2c look.

The camera 1L (left camera) adapted to output a left image signal and the camera 1R (right camera) adapted to output a right image signal are arranged side by side according to the distance between the human eyes to image the same subject. The display section 8 (refer to FIG. 2 which will be described later) displays a left image when supplied with the left image signal and displays a right image when supplied with the right image signal. Assuming that the intersection between the focus directions of the camera 1L and 1R is a reference plane, the parallax can be found from the distance between the reference plane and camera 1L or 1R.

Here, the subject 2b is located on the reference plane. Therefore, the user may not stereoscopically view the image displayed on the display section 8. However, the subject 2a is located more backward from the cameras 1L and 1R than the reference plane. Because of the depth effect, the subject 2a displayed on the display section 8 looks to the user like it is located more backward than the reference plane. On the other hand, the subject 2c is located more forward from the cameras 1L and 1R than the reference plane. Because of the pop-out effect, the subject 2c looks to the user like it is located more forward than the reference plane.

Assuming that the plane formed by the intersection between the focuses of the two cameras is a reference plane, a pop-out effect can be produced when the subject is located more forward than the reference plane, and a depth effect can be produced when the subject is located more backward than the reference plane. At this time, the difference in focus between the two cameras is referred to as parallax. Parallax is an important value in three-dimensional imaging. The largest concern for designers is from which subject position an image fails as a three-dimensional image. Therefore, the arrangement of the cameras 1L and 1R at proper positions relative to each other is the most time-consuming task.

FIG. 2 illustrates an internal configuration example of the signal processor 10.

The signal processor 10 includes a write section 3. The write section writes a left image (left image signal) supplied from the camera 1L to a left image memory 5L and a right image (right image signal) supplied from the camera 1R to a right image memory 5R. The signal processor 10 further includes a phase matching section 4. The phase matching section 4 matches, based on the write timings of the left and right images supplied from the write section 3, the phases of the left and right image signals supplied from the two cameras (cameras 1L and 1R) that are arranged according to the distance between the human eyes to image the same subject.

The signal processor 10 still further includes a phase adjustment section 6. The phase adjustment section 6 changes, based on the displacement specified by an operation section 9, the horizontal phases of the left and/or right image signal. The phase adjustment section 6 horizontally moves both or either of the left and right images displayed on the display section 8 by the left and right image signals by a predetermined distance, and outputs the left and right image signals with changed parallax between the left and right images. The signal processor 10 still further includes a read section 7. The read section 7 reads the left image from the left image memory 5L and the right image from the right image memory 5R and outputs the read left and right images to the display section 8.

Dual-port RAMs (Random Access Memory) are used as the left and right image memories 5L and 5R in the present example. On the other hand, a rotary switch is used, for example, as the operation section 9, thus allowing for the user to manipulate the switch to select which of the left and right images to move and specify the distance by which the image is to be moved. At this time, it is possible to move only the left or right image or move both of the images at the same time.

A description will be given next of the operation of each section.

The left and right images are supplied to the signal processor 10 from the cameras 1L and 1R. The write section 3 writes the input left and right images to the left and right image memories 5L and 5R, respectively. At the same time, the write section 3 outputs the input timings of the left and right images supplied to the signal processor 10 to the phase matching section 4.

The phase matching section 4 outputs the left image write address, found based on the input timing received from the write section 3, to the left image memory 5L. The left image is written to the left image write address of the left image memory 5L by the write section 3. Similarly, the phase matching section 4 outputs the right image write address to the right image memory 5R. The right image is written to the right image write address of the right image memory 5R by the write section 3. At the same time, the phase matching section 4 outputs the read start addresses and the equivalent timing, which will be described later, to the phase adjustment section 6. The left and right images are read respectively from the read start addresses of the left and right image memories 5L and 5R by the read section 7.

The phase adjustment section 6 adds the delay, entered from the operation section 9, to the read start address received from the phase matching section 4. Then, the phase adjustment section 6 finds the left and right image read addresses. The left image is read from the left image read address of the left image memory 5L by the read section 7. The right image is read from the right image read address of the right image memory 5R by the read section 7. The phase adjustment section 6 outputs these read addresses to the read section 7.

The read section 7 reads the left and right images respectively from the left and right image memories 5L and 5R based on the left and right image read addresses received from the phase adjustment section 6 and outputs the left and right images to the display section 8. At this time, the read section 7 identifies those areas displayed three-dimensionally thanks to the overlap of the left and right images with changed parallax and other areas where only the left or right image is displayed two-dimensionally. Then, the read section outputs the left and/or right image signal in which the image in the two-dimensionally displayed areas has been replaced by an image different from that in the three-dimensionally displayed areas.

Here, if the left and right image signals are sequentially read from the unshown imaging elements of the cameras 1L and 1R, the fact that these left and right image signals are sequentially supplied to the signal processor 10 will be referred to as "normal input." The fact that the left and right image signals are output in this sequence to the display section 8 will be referred to as "normal output." On the other hand, if the images displayed by the left and right image signals that are read sequentially from the unshown imaging elements are mirror symmetrical with each other because, for example, of a mirror provided in front of the cameras 1L and 1R, the fact that these left and right image signals are sequentially supplied to the signal processor 10 will be referred to as "flipped input." The fact that the left and right image signals are flipped and output as with normal output will be referred to as "flipped output."

The read section 7 in the present example replaces, by other image signal, the area not including the left or right image signal on the screen of the display section due to leading or lagging phase of the left or right image signal to be supplied, and outputs the resultant signal. On the other hand, if the subject image light entering the camera 1L and that entering the camera 1R are flipped relative to each other, the read section 7 is also capable of flipping the output of the flipped and input left or right image signal, replacing, by other image signal, the area not including the left or right image signal, and outputting the resultant signal. The display section 8 is a three-dimensional monitor adapted to three-dimensionally display the subject based on the left and right image signals read respectively from the left and right image memories 5L and 5R.

FIG. 3 illustrates a more detailed internal configuration example of the signal processor 10.

The signal processor 10 processes the left and right image signals separately to adjust the phases of these signals.

As illustrated in FIG. 2, the signal processor 10 includes the left image memory 5L adapted to store the left images. The left image memory 5L is supplied with left image data (I_LEFT_DATA) and a left image write address (WR_ADRS_LEFT). The left image data is determined by the left image signal. The left image write address specifies the write address in the left image memory 5L. Further, the left image memory 5L is supplied with a left image read address (RE_ADRS_LEFT) from which the left image is read by the read section 7, thus allowing for left image data (O_LEFT_DATA) that has been adjusted in phase to be read by the read section 7.

The phase matching section 4 includes a left image write address counter 11L adapted to count the write address of the left image memory 5L to which the left image signal is written by the write section 3. The phase matching section 4 further includes a right image write address counter 11R adapted to count the write address of the right image memory 5R to which the right image signal is written by the write section 3. The left image write address counter 11L repeats a cycle of counting the address of the left image memory 5L to which the left image data is written, being reset to '0' when the count exceeds 10 bits (1023) and starting counting again. This process is similarly performed by the right image write address counter 11R.

The phase matching section 4 still further includes a left image address sampling section 12L. The same section 12L finds, based on the write address, the left image read start address used by the read section 7 to read the left image signal from the left image memory 5L. The phase matching section 4 still further includes a right image address sampling section 12R. The same section 12R finds, based on the write address, the right image read start address used by the read section 7 to read the right image signal from the right image memory 5R.

Still further, the phase matching section 4 includes a first addition section 13L. The same section 13L outputs the left image sum address obtained by adding together a fixed delay and the left image read start address. The fixed delay is determined by an allowable change in phase of the left image signal. Still further, the phase matching section 4 includes a first addition section 13R. The same section 13R outputs the right image sum address obtained by adding together a fixed delay and the right image read start address. The fixed delay is determined by an allowable change in phase of the right image signal. The first addition section 13L is supplied with the fixed delay. The same section 13L is also supplied with the left image read start address (RE_START_LEFT) from the left image address sampling section 12L. The first addition section 13L outputs the left image sum address (ADD_ADRS_LEFT) obtained by addition. This process is similarly performed by the first addition section 13R.

Still further, the phase matching section 4 includes a comparison section 14L. The same section 14L compares the left image write address and left image sum address and outputs the position of the left image sum address in the left image write address as an equivalent timing at which the left and right image signals are in phase. Still further, the phase matching section 4 includes a comparison section 14R. The same section 14R compares the right image write address and right image sum address and outputs the position of the right image sum address in the right image write address as an equivalent timing at which the left and right image signals are in phase. The comparison section 14L compares the left image write address (WR_ADRS_LEFT) supplied from the left image write address counter 11L and the left image sum address (ADD_ADRS_LEFT) supplied from the first addition section 13L. Then, the same section 14L outputs the comparison result. This comparison result is supplied to a left image read address counter 17L, thus allowing for phase matching between the left and right images. This process is similarly performed by the comparison section 14R.

The left image address sampling section 12L is supplied with a timing signal (I_LEFT_TIMING) from an unshown timing generator to sample the left image write address. Further, the same section 12L is supplied with a left image write address from the left image write address counter 11L. Then, the left image address sampling section 12L outputs a left image read start address (RE_START_LEFT) based on the sampled left image write address. The left image read start address specifies the beginning of the left image signal to the phase adjustment section 6.

The phase adjustment section 6 includes a delay control section 15. The same section 15 controls the read delay for reading the left image signal from the left image memory 5L and right image signal from the right image memory 5R based on the entry from the operation section 9. A CPU (Central Processing Unit) is, for example, used as the delay control section 15. The operation section 9 includes, for example, a control knob and determines the delay of the left or right image according to the level on the control knob manipulated by the user.

Further, the phase adjustment section 6 includes a second addition section 16L. The same section 16L outputs a left image control address by adding together the left image read delay and left image read start address. The left image control address is used to control the read position for reading the left image signal from the left image memory 5L. Still further, the phase adjustment section 6 includes a second addition section 16R. The same section 16R outputs a right image control address by adding together the right image read delay and right image read start address. The right image control address is used to control the read position for reading the right image signal from the right image memory 5R.

The second addition section 16L is supplied with a left image read delay (RE_LEFT_DELAY) from the delay control section 15 and the left image read start address (RE_START_LEFT) from the left image address sampling section 12L. Then, the same section 16L adds the left image read delay (RE_LEFT_DELAY) used as a change in phase specified by the user manipulation to the left image read start address (RE_START_LEFT) used as a reference address. Then, the second addition section 16L outputs the left image control address (LEFT_ADRS_CONTROL) obtained by addition. Here, if the change in phase is equal to the fixed delay, the phase of the left image does not change. Therefore, the left image displayed on the display section 8 does not move. This process is similarly performed by the second addition section 16R.

It should be noted that the phase adjustment section 6 includes the left image read address counter 17L. The same counter 17L counts, based on the equivalent timing and left image control address, the left image read address of the left image memory 5L from which the left image signal is read by the read section 7. Further, the phase adjustment section 6 includes a right image read address counter 17R. The same counter 17R counts, based on the equivalent timing and right image control address, the right image read address of the right image memory 5R from which the right image signal is read by the read section 7.

The left image read address counter 17L is supplied with the left image control address (LEFT_ADRS_CONTROL) from the second addition section 16L and the comparison result from the comparison section 14L. Then, the left image read address counter 17L outputs, based on the comparison result, the left image read address to the left image memory 5L and read section 7. The left image read address corresponds to the delay by which the reading operation is delayed. This allows for the read section 7 to read the left image data (O_LEFT_DATA) from the left image memory 5L by the predetermined delay. This process is similarly performed by the right image read address counter 17R.

FIGS. 4A to 4V illustrate examples of operation timings of the different sections.

FIGS. 4A to 4F illustrate examples of timings for reading or writing the left image signal from or to the left image memory 5L.

FIG. 4A illustrates a configuration example of the left image signal.

The left image signal (I_LEFT_DATA) includes an active period (ACTIVE) and blanking period (BLK). The active period represents the period of time during which the left image signal is displayed on the display section 8. The blanking period represents the period of time during which the left image signal is not displayed on the display section 8. This left image signal is written to the left image memory 5L as left image data.

FIG. 4B illustrates the timing of a horizontal blanking period of the left image signal.

This timing is determined by the start of a horizontal blanking period (HD) shown in FIG. 4A. When a horizontal blanking period begins, this signal rises to high level. When a horizontal blanking period ends, this signal falls to low level.

FIG. 4C illustrates an example of a leading edge timing signal of the left image signal.

The leading edge timing signal (I_LEFT_TIMING) of the left image signal rises to high level upon the beginning of a horizontal blanking period of the left image signal. It should be noted, however, that this timing signal rises to high level only at the beginning of a horizontal blanking period, and that the signal falls to low level immediately thereafter.

FIG. 4D illustrates the write address of the left image signal.

When the left image signal is written to the left image memory 5L, the write address is counted for each horizontal pixel. Then, when the left image signal write address (WR_ADRS_LEFT) that starts from "0" is counted up to "1023," the address is reset to "0" again to repeat the counting.

FIG. 4E illustrates the left image signal read start address.

The left image write address counter 11L counts the left image write address (WR_ADRS_LEFT) in step with the writing of the left image (left image signal) to the left image memory 5L by the write section 3. Here, the left image address sampling section 12L loads the write address shown in FIG. 4D as the left image read start address ("585" in the present example) at the moment when the leading edge timing signal shown in FIG. 4C rises to high level.

FIG. 4F illustrates an example of addition of a fixed delay to the left image signal read address.

The first addition section 13L adds the fixed delay ("512" in the present example") to the left image read start address shown in FIG. 4E. As a result, the left image read start address changes to "585+512=1097." However, the address can be counted only up to "1023." Therefore, "1097−1023=74" is found as the left image read start address obtained by adding the fixed delay.

Here, the fixed delay is determined by the sizes of the left and right image memories 5L and 5R. In the present example, the fixed delay is "512." Therefore, if a horizontal line of the left and right images is 1024 pixels long, the left and right images can be moved up to 512 pixels or half-screen size. For the fixed delay, therefore, the sum of two values, one being a displacement large enough to accommodate the phase shift between the left and right image signals and another being an allowable change in phase for the user to change the phase using the operation section 9, is determined in advance. For example, if the allowable change in phase is "1000," it is necessary for the fixed delay to be greater than "1000."

FIGS. 4G to 4K illustrate examples of timings for reading or writing the right image signal from the right image memory 5R.

FIG. 4G illustrates a configuration example of the right image data.

The right image signal (I_RIGHT_DATA) includes an active period (ACTIVE) and blanking period (BLK). The active period represents the period of time during which the right image signal is displayed on the display section 8. The blanking period represents the period of time during which the right image is not displayed on the display section 8. It should be noted that the right and left image signals may be supplied to the signal processor 10 at slightly different times because of a slight difference in connection cables between the cameras 1L and 1R and the signal processor 10. Therefore, the signal processor 10 matches the phases of the input left and right images.

FIG. 4H illustrates the timing of a horizontal blanking period of the right image signal.

This timing is determined by the start of a horizontal blanking period (HD) shown in FIG. 4G. When a horizontal blanking period begins, this signal rises to high level. When a horizontal blanking period ends, this signal falls to low level.

FIG. 4I illustrates an example of a leading edge timing signal of the right image signal.

The leading edge timing signal (I_RIGHT_TIMING) of the right image signal rises to high level upon the beginning of a horizontal blanking period of the right image signal and then falls to low level immediately thereafter.

FIG. 4J illustrates the write address of the right image signal.

When the right image signal is written to the right image memory 5R, the write address is counted for each horizontal pixel. Then, when the right image signal write address (WR_ADRS_RIGHT) that starts from "0" is counted up to "1023," the address is reset to "0" again to repeat the counting.

FIG. 4K illustrates the right image signal read start address.

The right image write address counter 11R counts the right image write address (WR_ADRS_RIGHT) in step with the writing of the right image (right image signal) to the right image memory 5R by the write section 3. Here, the right image address sampling section 12R loads the write address shown in FIG. 4J as the right image read start address ("438" in the present example) at the moment when the leading edge timing signal shown in FIG. 4I rises to high level.

FIGS. 4L to 4U illustrate examples of phase adjustment between the left and right images.

FIG. 4L illustrates an equivalent timing at which the left image write address is equal to the left image write address after addition.

Here, the equivalent timing (EQ_TIM1) is shown that rises to high level when the left image write address (WR_ADRS_LEFT) shown in FIG. 4D is equal to the left image sum address (ADD_ADRS_LEFT) shown in FIG. 4F obtained by adding the fixed delay "512."

FIG. 4M illustrates an example of the left image control address.

The left image control address (LEFT_ADRS_CONTROL) illustrates an example in which the left image read start address (RE_START_LEFT) shown in FIG. 4E is matched to the equivalent timing (EQ_TIM1) shown in FIG. 4L.

FIG. 4N illustrates an example of the right image control address.

The right image control address (RIGHT_ADRS_CONTROL) illustrates an example in which the right image read start address (RE_START_RIGHT) shown in FIG. 4K is matched to the equivalent timing (EQ_TIM1) shown in FIG. 4L.

It should be noted that the change in phase specified by the delay control section 15 is "0" for both the left image control address (LEFT_ADRS_CONTROL) shown in FIG. 4M and the right image control address (RIGHT_ADRS_CONTROL) shown in FIG. 4N.

FIG. 4O illustrates an example of the left image read address.

As illustrated in FIG. 4M, the read counter begins from "585" for the left image control address (LEFT_ADRS_CONTROL). Then, the left image read address counter 17L increments the read counter by one at a time.

FIG. 4P illustrates a configuration example of the left image signal.

A blanking period of the left image signal (O_LEFT_DATA) is shown to begin from one of the positions indicated by the equivalent timing shown in FIG. 4L.

FIG. 4Q illustrates an example of the right image read address.

As illustrated in FIG. 4N, the read counter begins from "438" for the right image control address (RIGHT_ADRS_CONTROL). Then, the right image read address counter 17R increments the read counter by one at a time.

FIG. 4R illustrates a configuration example of the right image signal.

A blanking period of the right image signal (O_RIGHT_DATA) is shown to begin from one of the positions indicated by the equivalent timing shown in FIG. 4L.

FIGS. 4P and 4R show that the left and right image signals are in phase with no difference.

A description will be given next of a case in which the user changes the phase of the left image signal by manipulating the operation section 9. Here, an example will be shown in which the phase change is set to "+150."

FIG. 4S illustrates an example of the left image control address.

The left image control address (LEFT_ADRS_CONTROL) illustrates an example in which the left image read start address (RE_START_LEFT) shown in FIG. 4E is matched to the equivalent timing (EQ_TIM1) shown in FIG. 4L. In the present example, the phase change is set to "+150." Therefore, the left image address is 585+150=735.

FIG. 4T illustrates an example of the left image read address.

As illustrated in FIG. 4S, the read counter begins from "735" for the left image control address (LEFT_ADRS_CONTROL). Then, the read counter is incremented by one at a time.

FIG. 4U illustrates a configuration example of the left image signal.

It is shown that the output timing of the left image signal (O_LEFT_DATA) is delayed relative to the equivalent timing shown in FIG. 4L because of the change in read timing.

FIG. 4V illustrates an example of a masking timing.

This masking timing is used to mask the output of the image signal during masking of the read section 7. The masking timing (I_HD) in the present example is shown to be delayed relative to the left image horizontal timing (LEFT_HD) shown in FIG. 4B. In the description given below, the fact that the image in the two-dimensionally displayed areas are replaced with an image different from that in the three-dimensionally displayed areas and then displayed on the display section 8 will be referred to as masking.

Figure 5:
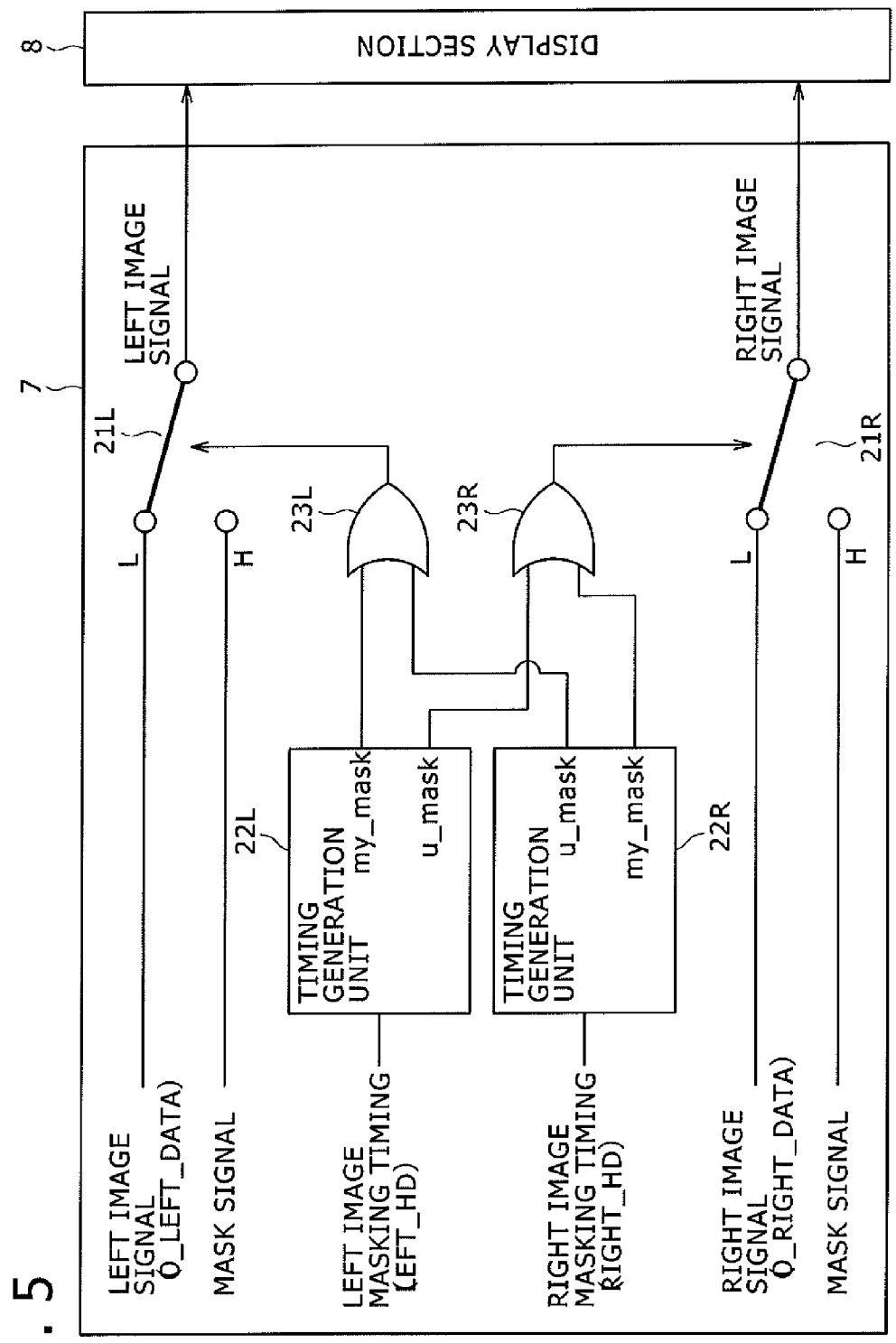
FIG. 5 is a block diagram illustrating an internal configuration example of a read section according to the embodiment of the present disclosure.

FIG. 5 illustrates an internal configuration example of the read section 7.

The read section 7 includes selection sections 21L and 21R. The selection section 21L selects whether to output a left image signal or masking signal to the display section 8. The selection section 21R selects whether to output a right image signal or masking signal to the display section 8. Further, the read section 7 includes timing generation units 22L and 22R adapted to output, based on the predetermined timing, an instruction to replace the image in the two-dimensionally displayed areas with a different image. The timing generation unit 22L generates a masking timing of the left and right image signals based on the left image signal. The timing generation unit 22R generates a masking timing of the left and right image signals based on the right image signal. On the other hand, each of the selection sections 21L and 21R selects the left or right image signal supplied from the phase adjustment section 6 or the masking signal for replacing the image with a different image based on the instruction from the timing generation unit 22L or 22R.

Further, the read section 7 includes a logical sum calculation section 23L. The same section 23L takes the logical sum of the masking timings supplied from the timing generation units 22L and 22R and specifies the output timing of the left image signal to the selection section 21L. Still further, the read section 7 includes a logical sum calculation section 23R. The same section 23R takes the logical sum of the masking timings supplied from the timing generation units 22L and 22R and specifies the output timing of the right image signal to the selection section 21R.

In the read section 7, the selection section 21L is supplied with a left image signal and masking signal, and the selection section 21R is supplied with a right image signal and masking signal. Here, the masking signals supplied to the selection sections 21L and 21R are the same signal. When low level is selected, the selection sections 21L and 21R output the left and right image signals, respectively, so that the left and right images are displayed on the display section 8. On the other hand, when high level is selected, the selection sections 21L and 21R output the masking signal, thus masking the intended areas of the left and right images. This masking signal can be used, for example, to specify a color with which to fill the two-dimensionally displayed areas such as black, white or gray.

The timing generation units 22L and 22R output, based on the input masking timings of the left and right images, masking timings adapted to mask the left or right image. The logical sum calculation sections 23L and 23R take the logical sum of the masking timings supplied from the timing generation units 22L and 22R and output the results to the selection sections 21L and 21R, respectively. This allows for the masking timings of the left and right image signals to be controlled.

FIG. 6 illustrates an internal configuration example of the timing generation units 22L and 22R. Each of the timing generation units 22L and 22R includes a first storage block 26. The same section 26 stores a first masking timing used to mask the left or right image signal normally output to the read section 7 according to the subject image light. Further, each of the timing generation units 22L and 22R includes a second storage block 27. The same section 27 stores a second masking timing used to mask the left or right image signal flipped and output according to the flipped subject image light. Dual-port RAMs (Random Access Memory) are used, for example, as the first and second storage blocks 26 and 27.

Still further, each of the timing generation units 22L and 22R includes an address control block 25. The same section 25 supplies, based on the input delay, write and read addresses for the masking timings of the left and right image signals to the first and second storage blocks 26 and 27. The address control block 25 supplies the write and read addresses for the first masking timing to the first storage block 26 selected according to the normal or flipped output of the input left and/or right image signal. On the other hand, the address control block 25 supplies the write and read addresses for the second masking timing to the second storage block 27. Still further, each of the timing generation units 22L and 22R includes a selection section 28. The same section 28 selects a masking timing used to select whether to mask the left or right image. Then, the first or second masking timing is read from the first or second storage block 26 or 27 in each of the timing generation units 22L and 22R. The first or second storage block 26 or 27 is selected according to the normal or flipped output.

On the other hand, the address control block 25 changes the write and read addresses to be supplied to the first or second storage block 26 or 27 according to the change in phase of the left or right image signal if normal output is used as a reference. Here, the masking timing of the left and right image signals normally input from the cameras 1L and 1R is written to the first storage block 26. On the other hand, the masking timing of the left and right image signals flipped and input from the cameras 1L and 1R is written to the second storage block 27. The first and second storage blocks 26 and 27 are both supplied with a masking drive signal (I_HD) shown in FIG. 4V. Then, the write and read addresses are supplied to the first and second storage blocks 26 and 27 from the address control block 25.

The masking timings adapted to mask the left and right image signals are read from the first and second storage blocks 26 and 27. Two masking timings are available, one (my_mask) adapted to indicate that the own image signal is masked and another (u_mask) adapted to indicate that the other image signal is masked. For example, if the address control block 25 writes "100" to the first and second storage blocks 26 and 27 as the write address, the same section 25 writes "150," the sum of "100" and "50," to these storage blocks as the read address.

The address value of the masking drive signal (I_HD) written as "1" to the first and second storage blocks 26 and 27 is subjected to delay correction based on the input delay. Here, if the delay is "+10," the delay of the masking timing read from the first storage block 26 is also "+10." On the other hand, the delay of the masking timing read from the second storage block 27 is "−10."

In the case of normal input, the own and other images are masked at the same position. Therefore, the masking timing read from the first storage block 26 is output, for example, as the masking timing (u_mask) indicating that the left image is masked when the right image is the own image. Similarly, because low level is selected by the selection section 28, the masking timing read from the first storage block 26 is output as the masking timing (my_mask) indicating that the right image itself is masked.

In the case of flipped input, the own and other images are masked at different positions. Then, the fixed value (I_FLIP) that has risen to high level is supplied to the selection section 28, thus switching the same section 28 to high level. As a result, the masking timing read from the second storage block 27 is output, for example, as the masking timing (my_mask) indicating that the right image to be flipped and output is masked. Further, the masking timing read from the first storage block 26 is output, for example, as the masking timing (u_mask) indicating that the left image is masked when the right image is the own image.

FIGS. 7A to 7E illustrate examples in which the phases of the left and right images displayed on the display section 8 are adjusted.

A left image 31, right image 33 and superposed image 32, obtained by superposing the left and right images 31 and 33, are displayed on the display section 8. The user adjusts the phases of the left and right images by turning a control knob clockwise (positive direction) or counterclockwise (negative direction). The control knob is used as the operation section 9.

FIGS. 7A to 7K illustrate examples of how the images look when the left and right images 31 and 33 are moved horizontally.

Here, the term "first and second original positions" in FIGS. 7A to 7K refers to the positions of both edges of the left and right images when these images are in phase. Then, the phase adjustment section 6 displays, on the display section 8, the phase displacement specified by the operation section 9 or the value obtained by calculating meta data supplied from the cameras. The term "zoom" is an example of a camera parameter and indicates which parameter should be changed to achieve the current reference plane. In the present example, information is displayed on the display section 8 indicating that the images will look the same as when "3" is added to the current zoom settings of the cameras 1L and 1R if the movement of the left and right images is 10 pixels. Alternatively, the "distance" may be used as a parameter so that the user is notified that the movement of 10 pixels means the movement of the reference plane to the front or back.

FIG. 7A illustrates an example of display of the left image 31.

FIG. 7B illustrates an example of display of the right image 33.

FIG. 7C illustrates an example of display when only the left image 31 making up the superposed image 32 on the reference plane is moved.

FIG. 7D illustrates an example of display when only the right image 33 making up the superposed image 32 on the reference plane is moved.

FIG. 7E illustrates an example of display when both the left and right images 31 and 33 making up the superposed image 32 on the reference plane are moved.

It should be noted that the left and right images 31 and 33 are in phase in FIGS. 7C to 7E.

FIGS. 7F to 7H illustrate examples of how the images look when the left and right images 31 and 33 are moved to the left on a location other than the reference plane.

FIG. 7F illustrates an example of display when the left image 31 is moved to the left.

At this time, the left image 31 is visible on the left of the first original position. Also, the right image 33 equivalent in size to the visible left image 31 as a result of movement is visible on the left of the second original position.

FIG. 7G illustrates an example of display when the right image 33 is moved to the left.

At this time, the right image 33 is visible on the left of the first original position. Also, the left image 31 equivalent in size to the visible right image 33 as a result of movement is visible on the left of the second original position.

FIG. 7H illustrates an example of display when the left image 31 is moved to the left and the right image 33 is moved to the right.

Although the left and right images 31 and 33 are moved in the opposite directions, they are moved by the same distance. At this time, a depth effect can be produced. The distance by which the left and right images 31 and 33 are moved is parallax.

FIGS. 7I to 7K illustrate examples of how the images look when the left and right images 31 and 33 are moved to the right on a location other than the reference plane.

FIG. 7I illustrates an example of display when the left image 31 is moved to the right.

At this time, the left image 31 is visible on the right of the second original position. Also, the right image 33 equivalent in size to the visible left image 31 as a result of movement is visible on the right of the first original position.

FIG. 7J illustrates an example of display when the right image 33 is moved to the right.

At this time, the right image 33 is visible on the right of the second original position. Also, the left image equivalent in size to the visible right image 33 as a result of movement is visible on the right of the first original position.

FIG. 7K illustrates an example of display when the left image 31 is moved to the right and the right image 33 is moved to the left.

Although the left and right images 31 and 33 are moved in the opposite directions, they are moved by the same distance. At this time, a pop-out effect can be produced. The distance by which the left and right images 31 and 33 are moved is parallax.

FIGS. 8A to 8E illustrate an example in which a three-dimensionally displayed area and two-dimensionally displayed areas are displayed differently.

FIG. 8A illustrates the procedure for generating a three-dimensional image.

The left and right images 31 and 33 are output to the display section 8 based on the left and right image signals supplied from the two cameras 1L and 1R. The display section 8 displays the left and right images 31 and 33 alternately line by line or frame by frame, thus displaying the superposed image 32.

FIG. 8B illustrates an example in which the phases of the left and right images are changed by the operations shown in FIGS. 7A to 7K.

Here, the left image 31 is moved to the left, and the right image 33 is moved to the right. This produces two-dimensionally displayed areas and a three-dimensionally displayed area. In the two-dimensionally displayed areas, the left and right images 31 and 33 are displayed alone. In the three-dimensionally displayed area, the left and right images 31 and 33 are superposed.

FIGS. 8C to 8E illustrate examples in which the image in the two-dimensionally displayed areas is replaced by an image different from that in the three-dimensionally displayed area.

FIG. 8C illustrates an example of display in which the two-dimensionally displayed areas are blanked.

In this case, the user can clearly tell where the three-dimensionally displayed area is when verifying the images, thus providing improved visibility.

FIG. 8D illustrates an example of display in which the two-dimensionally displayed areas are displayed in white to suit the color (white) of the bezel of the display section 8.

FIG. 8E illustrates an example of display in which the two-dimensionally displayed areas are displayed in gray to suit the color (gray) of the bezel of the display section 8.

As described above, the image displayed in the two-dimensionally displayed areas to suit the color (e.g., black, white and gray) of the bezel of the display section 8 is in the same color as the bezel of the three-dimensional monitor. This ensures that the color of the two-dimensionally displayed areas does not adversely affect the visibility of the three-dimensionally displayed area.

Figures 9A, 9B, 9C:
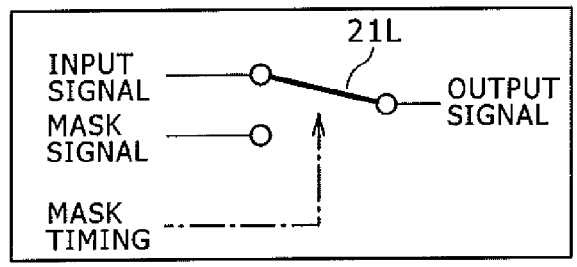
FIGS. 9A to 9C are explanatory diagrams illustrating the procedure for masking the display of the two-dimensionally displayed areas using a left image signal according to the embodiment of the present disclosure.

FIGS. 9A to 9C illustrate the procedure for masking the display of the two-dimensionally displayed areas using the left image signal.

As a basic procedure, the read section 7 generates masking signals adapted to specify masking timings to the left and right images to be superposed for three-dimensional display. The read section 7 performs the masking as follows using all the masking signals. If the masking signal is high for the input left and right image signals, the read section 7 generates a masking signal and outputs the signal to the display section 8 so as to display a fixed color such as black.

FIG. 9A illustrates an example in which the input left image signal and the display region of the display section 8 are in phase.

The input left image signal and the left image signal displayed on the screen of the display section 8 are in phase. The masking timing is low across the display region. Therefore, the left image signal displayed on the screen is not masked.

FIG. 9B illustrates an example in which the input left image is leading.

Because the input left image signal leads the display region of the display section 8, the left image actually displayed on the display section 8 moves to the left. At this time, there is an area on the right-hand edge of the display region where no valid left image signal is included. As a result, the masking timing rises to high level, thus masking this area in black.

FIG. 9C illustrates an example in which the input left image signal is lagging.

Because the input left image signal lags the display region of the display section 8, the left image actually displayed on the display section 8 moves to the right. At this time, there is an area on the left-hand edge of the display region where no valid left image signal is included. As a result, the masking timing rises to high level, thus masking this area in black.

FIGS. 10A to 10C illustrate the procedure for masking the display of the two-dimensionally displayed areas using the left and right image signals.

In order to process the left and right image signals for three-dimensional display, it is necessary to apply the masking position of one of the image signals to the other image signal. Therefore, a masking timing is generated by taking the logical sum of the masking signals used for the left and right image signals.

FIG. 10A illustrates an example in which the input left image signal is leading and the input right image signal is in phase.

Because the input left image signal leads the display region of the display section 8, the left image actually displayed on the display section 8 moves to the left. At this time, there is an area on the right-hand edge of the display region where no valid left image signal is included. As a result, the masking timing of the left image signal rises to high level, thus masking this area in black. On the other hand, the right image signal is in phase. However, when the right image signal is masked in synchronism with the making timing, the right-hand edges of both of the left and right images are masked in black on the display section 8.

FIG. 10B illustrates an example in which the input left image signal is lagging and the input right image signal is in phase.

Because the input left image signal lags the display region of the display section 8, the left image actually displayed on the display section 8 moves to the right. At this time, there is an area on the left-hand edge of the display region where no valid left image signal is included. As a result, the masking timing of the left image signal rises to high level, thus masking this area in black. On the other hand, the right image signal is in phase. However, when the right image signal is masked in synchronism with the making timing, the left-hand edges of both of the left and right images are masked in black on the display section 8.

FIG. 10C illustrates an example in which the input left image signal is leading and the input right image signal is lagging.

Because the input left image signal leads the display region of the display section 8, the left image actually displayed on the display section 8 moves to the left. On the other hand, the input right image signal lags the display region of the display section 8, the right image actually displayed on the display section 8 moves to the right. At this time, there is an area on the right-hand edge of the display region where no valid left image signal is included, and there is an area on the left-hand edge of the display region where no valid right image signal is included. As a result, the masking timing rises to high level in each of the areas where no effective image signal is included, thus masking these areas in black. This results in the left- and right-hand edges of the left and right images being masked on the display section 8.

FIGS. 11A to 11C are explanatory diagrams illustrating an example in which the left image signal is flipped and input.

If a three-dimensional image is edited, a horizontally flipped image signal may be input to the signal processor 10 depending on the setups of the cameras 1L and 1R. For example, if a reflecting mirror is provided, for example, in front of the camera 1L, an image signal, whose image is flipped relative to the image captured in the normal orientation, is input to the signal processor 10. Therefore, it is necessary to tailor the masking timing to the flipped input of the image signal.

FIG. 11A illustrates an example in which the flipped and input left image signal is in phase with the display region of the display section 8.

The input left image signal and the left image signal displayed on the display section 8 are in phase. In addition, the masking timing is low across the display region. Therefore, the left image signal displayed on the screen is not masked.

FIG. 11B illustrates an example in which the input left image signal is leading.

Because the input left image signal leads the display region of the display section 8, the left image actually displayed on the display section 8 moves to the left. At this time, no valid left image signal is included on the left-hand edge of the input left image signal. As a result of the flipping of this left image signal, there is an area on the right-hand edge of the display region where no valid left image signal is included. As a result, the masking timing rises to high level, thus masking this area in black.

FIG. 11C illustrates an example in which the input left image is lagging.

Because the input left image signal lags the display region of the display section 8, the left image actually displayed on the display section 8 moves to the right. At this time, no valid left image signal is included on the right-hand edge of the input left image signal. As a result of the flipping of this left image, there is an area on the left-hand edge of the display region where no valid left image signal is included. As a result, the masking timing rises to high level, thus masking this area in black.

Figures 12A, 12B:
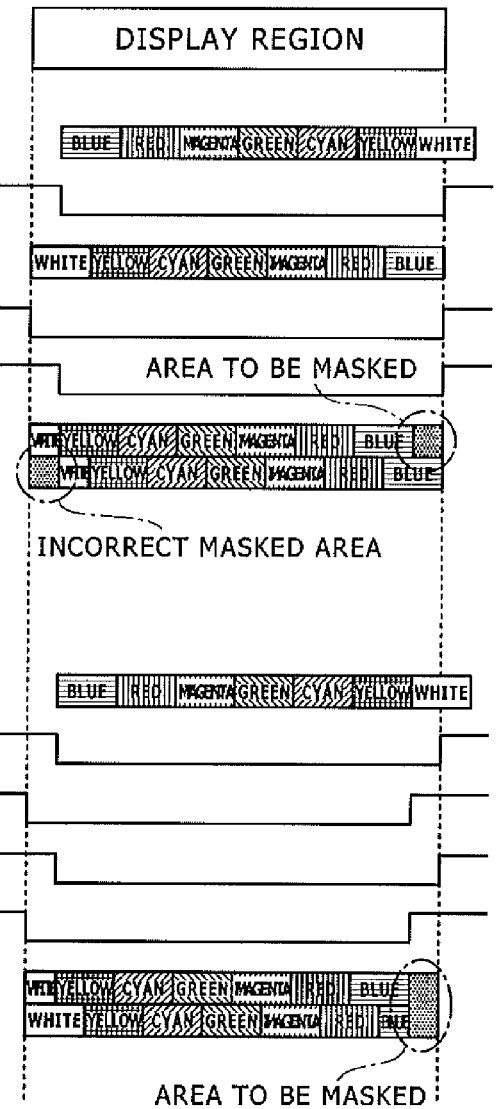
FIGS. 12A and 12B are explanatory diagrams illustrating the procedure for masking the display of the two-dimensionally displayed areas using the left and right image signals according to the embodiment of the present disclosure.

FIGS. 12A and 12B illustrate the procedure for masking the display of the two-dimensionally displayed areas using the left and right image signals.

If one of the image signals is flipped and input to the signal processor 10, the images are not properly displayed by masking the display according to the above method. In this case, the masking timing for one of the image signals is different from that for the other image signal.

FIG. 12A illustrates an example of incorrect screen display when the flipped and input left image signal is leading and the input right image signal is in phase. Because the flipped and input left image signal leads the display region of the display section 8, the masking timing of the left image signal also moves to the right. On the other hand, there is no phase delay with the right image signal that is normally input. Therefore, the masking timing of the right image signal does not move. In this case, if the logical sum of the masking timings of the left and right image signals is taken, the resultant masking timing erroneously masks the left-hand edge of the right image signal in accordance with the rightward movement of the masking timing of the left image signal. However, what should be masked is the right-hand edge of the image to be displayed on the display section 8 where there is no right image signal.

FIG. 12B illustrates an example of correct screen display when the flipped and input left image signal is leading and the right image signal is in phase.

The flipped and input left image signal and the masking timing of the left image signal are the same as those shown in FIG. 12A. Here, the masking timing of the left image signal is flipped and passed as a masking timing of the right image signal. Then, the logical sum of the masking timings of the left image signal and that of the masking timings of the right image signal are found. As a result, the right-hand edges, i.e., the areas to be masked, of both of the left and right images displayed on the display section 8 are masked in black.

A description will be given next of an example of the process performed by each of the sections.

Figure 13:
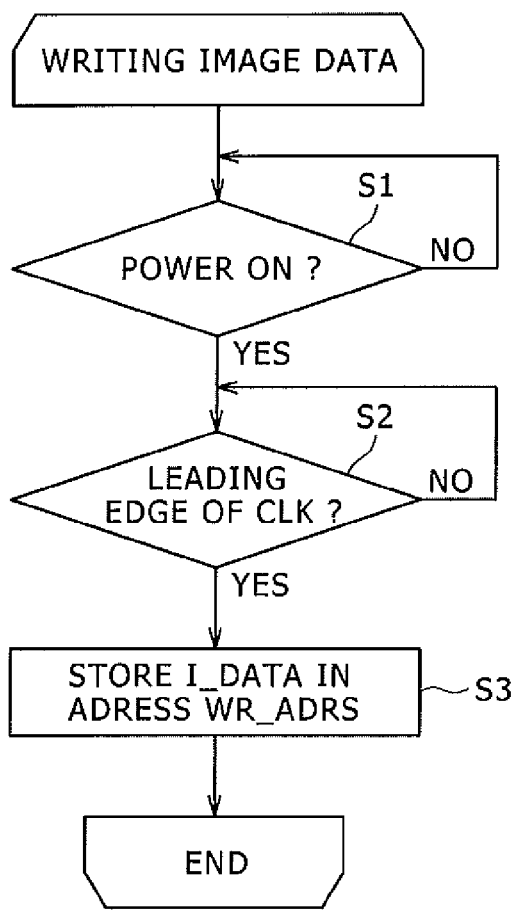
FIG. 13 is a flowchart illustrating an example of writing image data according to the embodiment of the present disclosure.

FIG. 13 illustrates an example of writing image data.

At first, the write section 3 determines whether or not the signal processor 10 has been powered on (step S1). If the signal processor 10 has not been powered on, the write section 3 waits until the signal processor 10 is powered on.

When the signal processor 10 has been powered on, the write section 3 determines whether the clock is on the leading edge (step S2). In the description given below, the term "clock" refers to a clock used to process the image signals, and we assume, as an example, that the circuit operates on the leading edge of the clock.

When the clock is on the leading edge, the write section 3 performs the following process (step S3). That is, the write section 3 stores the left image data (I_LEFT_DATA) in the left image write address (WR_ADRS_LEFT) of the left image memory 5L. On the other hand, the write section 3 stores the right image data (I_RIGHT_DATA) in the right image write address (WR_ADRS_RIGHT) of the right image memory 5R.

Figure 14:
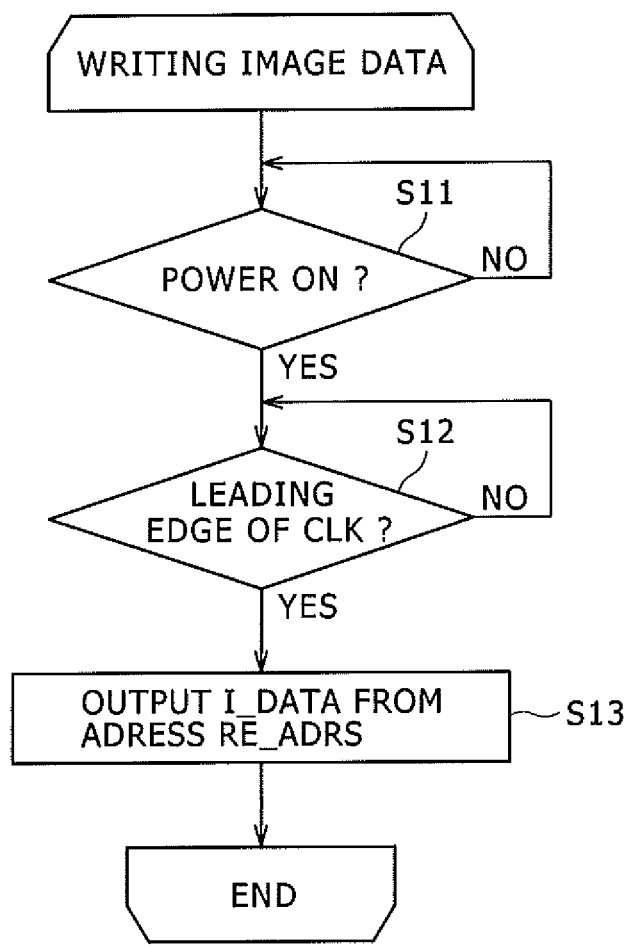
FIG. 14 is a flowchart illustrating an example of reading image data according to the embodiment of the present disclosure.

FIG. 14 illustrates an example of reading image data.

At first, the read section 7 determines whether or not the signal processor 10 has been powered on (step S11). If the signal processor 10 has not been powered on, the read section 7 waits until the signal processor 10 is powered on.

When the signal processor 10 has been powered on, the read section 7 determines whether or not the clock is on the leading edge (step S12). If the clock is not on the leading edge, the read section 7 waits until the clock is on the leading edge.

When the clock is on the leading edge, the read section 7 performs the following process (step S13). That is, the read section 7 reads the left image data (I_LEFT_DATA) from the left image read address (RE_ADRS_LEFT) of the left image memory 5L. On the other hand, the read section 7 reads the right image data (I_RIGHT_DATA) from the right image read address (RE_ADRS_RIGHT) of the right image memory 5R.

Figure 15:
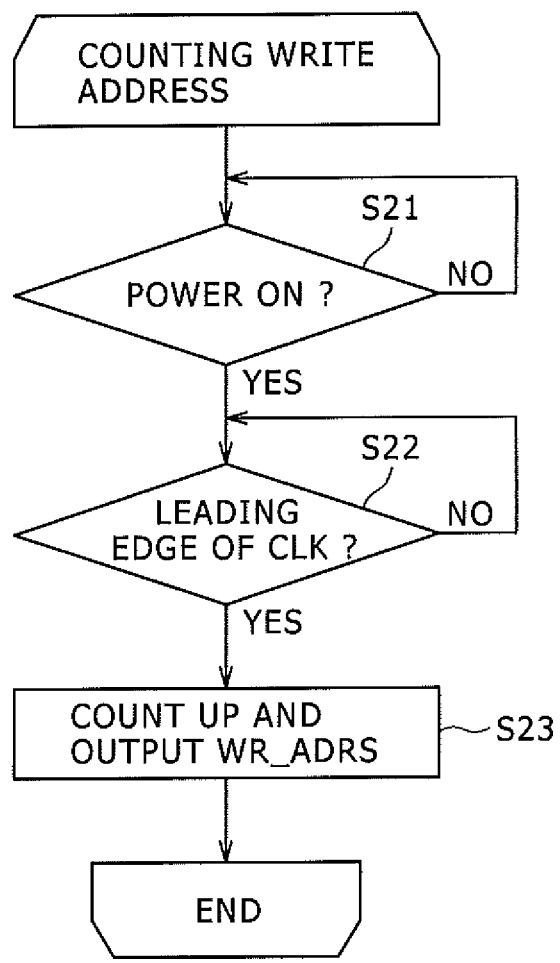
FIG. 15 is a flowchart illustrating an example of a process performed by a write address counter according to the embodiment of the present disclosure.

FIG. 15 illustrates an example of address counting performed by the write address counters (left and right image write address counters 11L and 11R).

At first, the write address counter determines whether or not the signal processor 10 has been powered on (step S21). If the signal processor 10 has not been powered on, the write address counter waits until the signal processor 10 is powered on.

When the signal processor 10 has been powered on, the write address counter determines whether or not the clock is on the leading edge (step S22). If the clock is not on the leading edge, the write address counter waits until the clock is on the leading edge.

When the clock is on the leading edge, the write address counter performs the following process (step S23). That is, the left image write address counter 11L increments the left image write address (WR_ADRS_LEFT) and outputs this address value to the left image memory 5L. On the other hand, the right image write address counter 11R increments the right image write address (WR_ADRS_RIGHT) and outputs this address value to the right image memory 5R.

Figure 16:
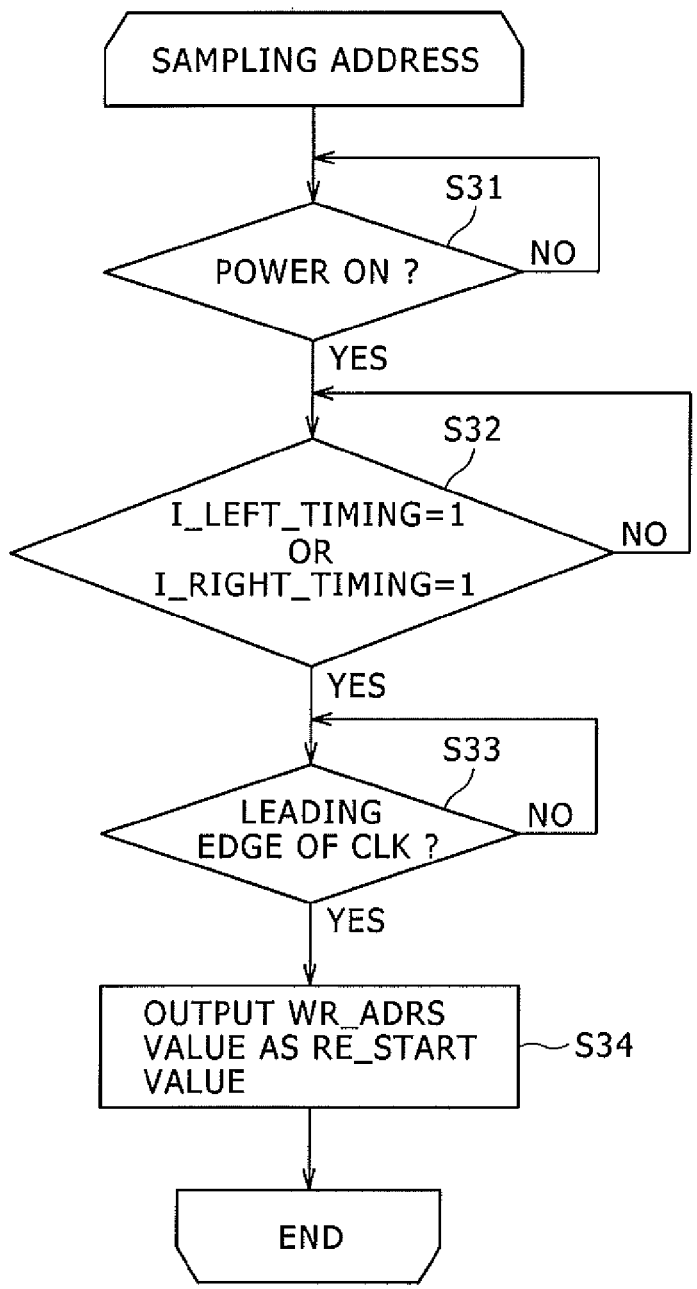
FIG. 16 is a flowchart illustrating an example of address sampling according to the embodiment of the present disclosure.

FIG. 16 illustrates an example of address sampling performed by the address sampling section (left and right image address sampling sections 12L and 12R).

At first, the address sampling section determines whether or not the signal processor 10 has been powered on (step S31). If the signal processor 10 has not been powered on, the address sampling section waits until the signal processor 10 is powered on.

When the signal processor 10 has been powered on, the address sampling section determines whether the timing (I_LEFT_TIMING or I_RIGHT_TIMING) is equal to "1" (step S32). If the timing is not equal to "1," the address sampling section waits until the timing is equal to "1."

When the timing is equal to "1," the address sampling section determines whether or not the clock is on the leading edge (step S33). If the clock is not on the leading edge, the address sampling section waits until the clock is on the leading edge.

When the clock is on the leading edge, the address sampling section performs the following process (step S34). That is, the left image address sampling section 12L outputs the address value of the left image write address (WR_ADRS_LEFT) to the second and first addition sections 16L and 13L as the left image read start address (RE_START_LEFT). On the other hand, the right image address sampling section 12R outputs the address value of the right image write address (WR_ADRS_RIGHT) to the second and first addition sections 16R and 13R as the right image read start address (RE_START_RIGHT).

Figure 17:
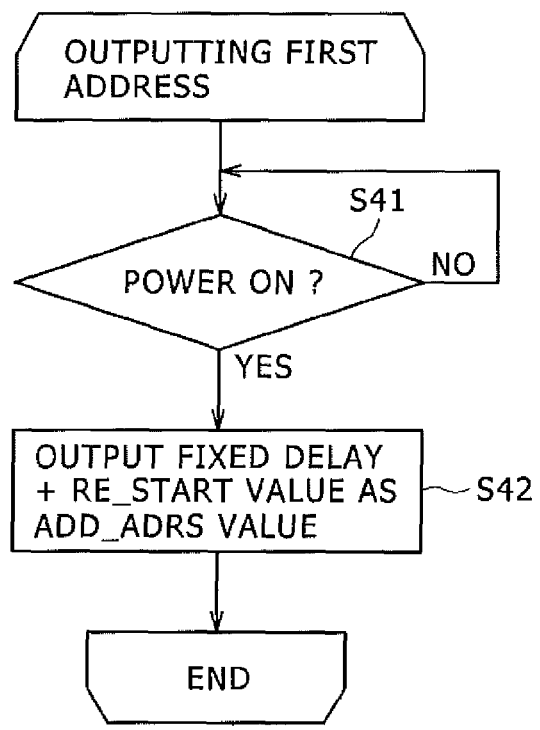
FIG. 17 is a flowchart illustrating an example of outputting a first address according to the embodiment of the present disclosure.

FIG. 17 illustrates an example of first address output performed by the first addition section (collectively refers to the first addition sections 13L and 13R).

At first, the first addition section determines whether or not the signal processor 10 has been powered on (step S41). If the signal processor 10 has not been powered on, the first addition section waits until the signal processor 10 is powered on.

When the signal processor 10 has been powered on, the first addition section performs the following process (step S42). That is, the first addition section 13L adds together the left image read start address (RE_START_LEFT) received from the left image address sampling section 12L and the fixed delay ("512" in the present example). Then, the first addition section 13L outputs this sum to the left image read address counter 17L as the left image sum address (ADD_ADRS_LEFT).

On the other hand, the first addition section 13R adds together the right image read start address (RE_START_RIGHT) received from the right image address sampling section 12R and the fixed delay. Then, the first addition section 13R outputs this sum to the right image read address counter 17R as the right image sum address (ADD_ADRS_RIGHT).

Figure 18:
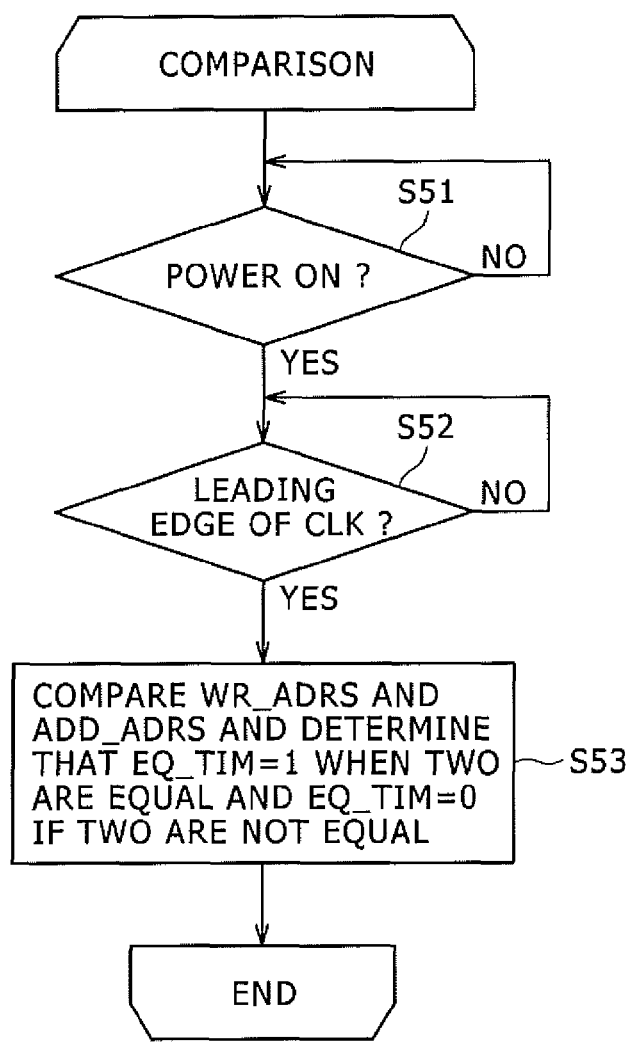
FIG. 18 is a flowchart illustrating an example of comparison according to the embodiment of the present disclosure.

FIG. 18 illustrates an example of address comparison performed by the comparison section (collectively refers to the comparison sections 14L and 14R).

At first, the comparison section determines whether or not the signal processor 10 has been powered on (step S51). If the signal processor 10 has not been powered on, the comparison section waits until the signal processor 10 is powered on.

When the signal processor 10 has been powered on, the comparison section determines whether the clock is on the leading edge (step S52). If the clock is not on the leading edge, the comparison section waits until the clock is on the leading edge.

When the clock is on the leading edge, the comparison section performs the following process (step S53). That is, the comparison section 14L compares the left image write address (WR_ADRS_LEFT) supplied from the left image write address counter 11L against the left image sum address (ADD_ADRS_LEFT) supplied from the first addition section 13L. Then, when these addresses are equal, the comparison section determines that the equivalent timing (EQ_TIM) is 1. If these addresses are not equal, the comparison section determines that the equivalent timing (EQ_TIM) is not 1.

The comparison section 14R compares the right image write address (WR_ADRS_RIGHT) supplied from the right image write address counter 11R against the right image sum address (ADD_ADRS_RIGHT) supplied from the first addition section 13R. Then, when these addresses are equal, the comparison section determines that the equivalent timing (EQ_TIM) is 1. If these addresses are not equal, the comparison section determines that the equivalent timing (EQ_TIM) is not 1.

Figure 19:
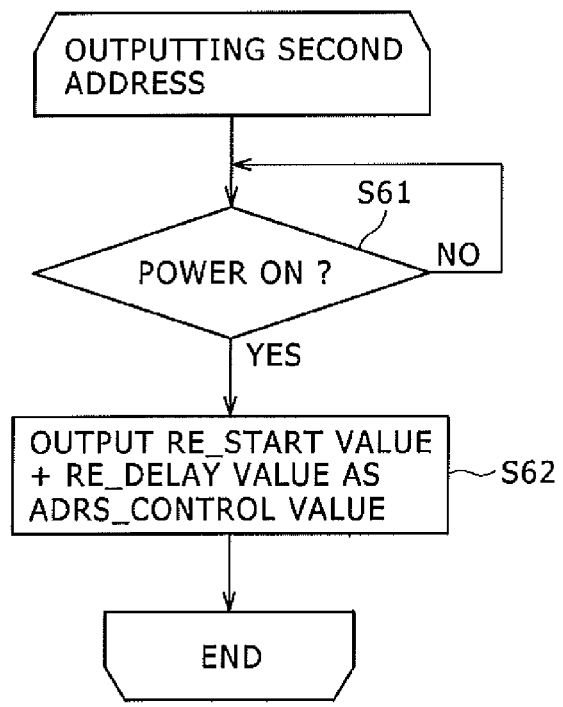
FIG. 19 is a flowchart illustrating an example of outputting a second address according to the embodiment of the present disclosure.

FIG. 19 illustrates an example of second address output performed by the second addition section (collectively refers to the second addition sections 16L and 16R).

At first, the second addition section determines whether or not the signal processor 10 has been powered on (step S61). If the signal processor 10 has not been powered on, the second addition section waits until the signal processor 10 is powered on.

When the signal processor 10 has been powered on, the second addition section performs the following process (step S62). That is, the second addition section 16L adds together the left image read start address (RE_START_LEFT) received from the left image address sampling section 12L and a left image read delay (RE_LEFT_DELAY) received from the delay control section 15. Then, the second addition section 16L outputs this sum to the left image read address counter 17L as the left image control address value (LEFT_ADRS_CONTROL).

On the other hand, the second addition section 16R adds together the right image read start address (RE_START_RIGHT) received from the right image address sampling section 12R and a right image read delay (RE_RIGHT_DELAY) received from the delay control section 15. Then, the second addition section 16R outputs this sum to the right image read address counter 17R as the right image control address value (RIGHT_ADRS_CONTROL).

Figure 20:
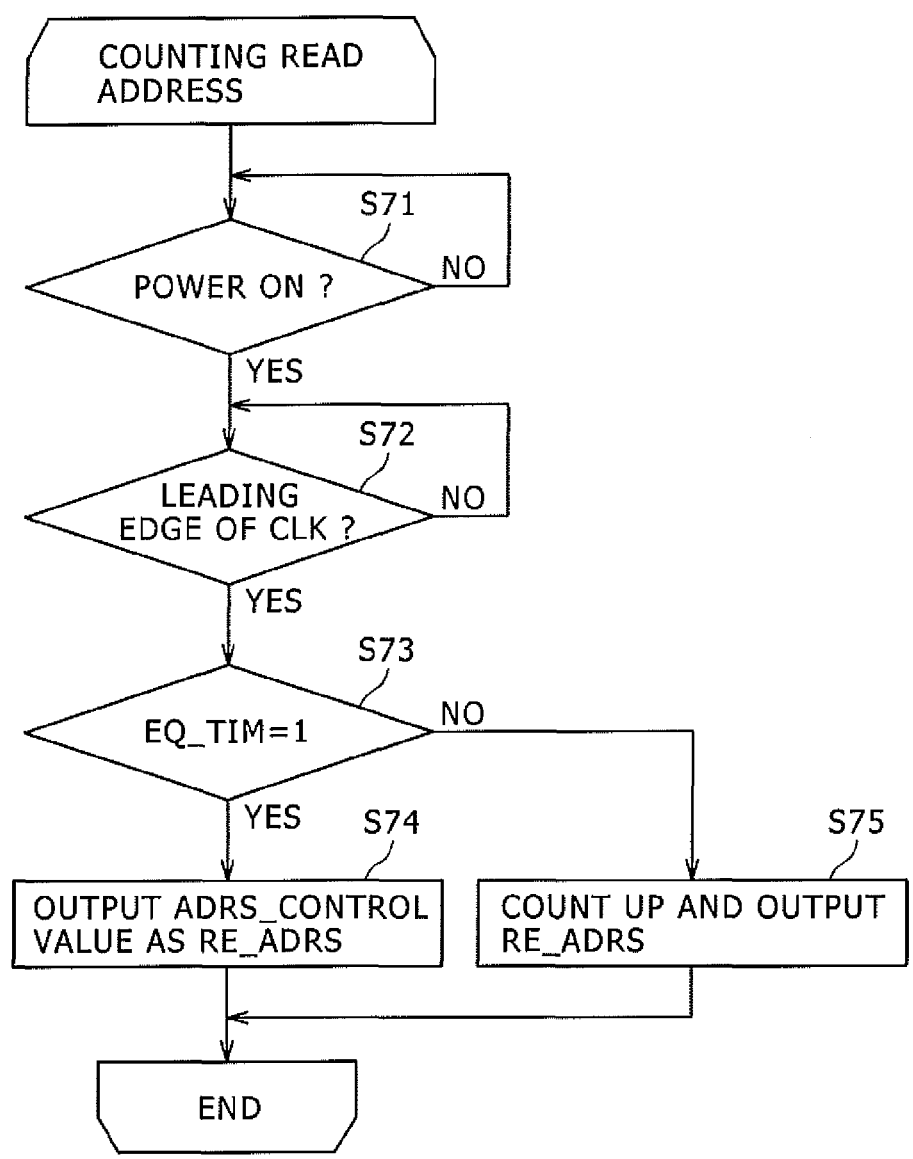
FIG. 20 is a flowchart illustrating an example of a process performed by a read address counter according to the embodiment of the present disclosure.

FIG. 20 illustrates an example of read address counting performed by the read address counter (collectively refers to the left and right image read address counters 17L and 17R).

At first, the read address counter determines whether or not the signal processor 10 has been powered on (step S71). If the signal processor 10 has not been powered on, the read address counter waits until the signal processor 10 is powered on.

When the signal processor 10 has been powered on, the read address counter determines whether or not the clock is on the leading edge (step S72). If the clock is not on the leading edge, the read address counter waits until the clock is on the leading edge.

When the clock is on the leading edge, the read address counter determines whether or not the equivalent timing (EQ_TIM) is 1 (step S73). When the equivalent timing (EQ_TIM) is 1, the read address counter performs the following process (step S74). That is, the left image read address counter 17L outputs the value of the left image control address (LEFT_ADRS_CONTROL) as the left image read address (RE_ADRS_LEFT). On the other hand, the right image read address counter 17R outputs the value of the right image control address (RIGHT_ADRS_CONTROL) as the right image read address (RE_ADRS_RIGHT).

In step S73, if the equivalent timing (EQ_TIM) is not 1, the read address counter performs the following process (step S75). That is, the left image read address counter 17L increments the left image read address (RE_ADRS_LEFT) and outputs the resultant address. On the other hand, the right image read address counter 17R increments the right image read address (RE_ADRS_RIGHT) and outputs the resultant address.

Figure 21:
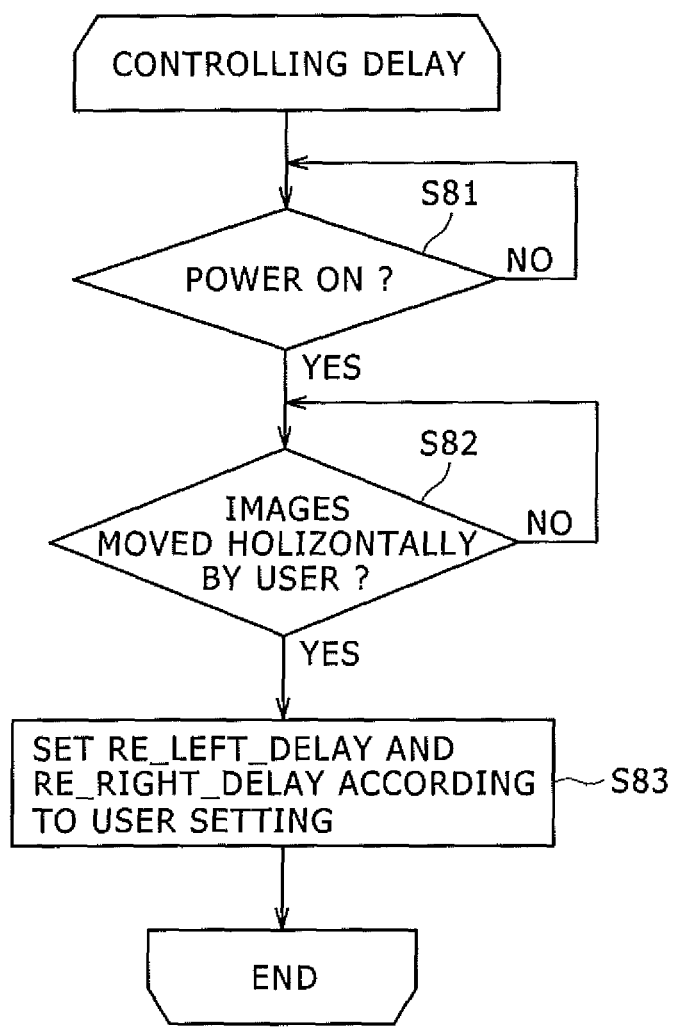
FIG. 21 is a flowchart illustrating an example of control adapted to delay the reading of the left and right image signals according to the embodiment of the present disclosure.

FIG. 21 illustrates an example of control exercised by the delay control section 15 to delay the reading of the left and right image signals.

At first, the delay control section 15 determines whether or not the signal processor 10 has been powered on (step S81). If the signal processor 10 has not been powered on, the delay control section 15 waits until the signal processor 10 is powered on.

When the signal processor 10 has been powered on, the delay control section 15 determines whether or not the user has horizontally moved the left and right images using the operation section 9 (step S82). If the left and right images have not been moved horizontally, the delay control section 15 waits until the images are horizontally moved.

When the left and right images have been moved horizontally, the delay control section 15 sets a left image read delay (RE_LEFT_DELAY) or right image read delay (RE_RIGHT_DELAY) according to the horizontal movement set by the user. Then, the delay control section 15 outputs the set read delay to the second addition section 16L or 16R (step S83).

FIGS. 22A to 22F illustrate display examples in which the left and right images are moved horizontally.

Figure 22D:
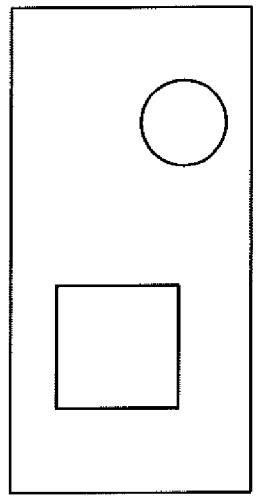
FIGS. 22A to 22F are explanatory diagrams illustrating display examples when the phase difference between the left and right images is changed according to the embodiment of the present disclosure.
Figure 22E:
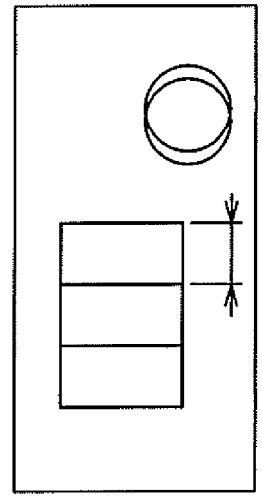
Figure 22F:
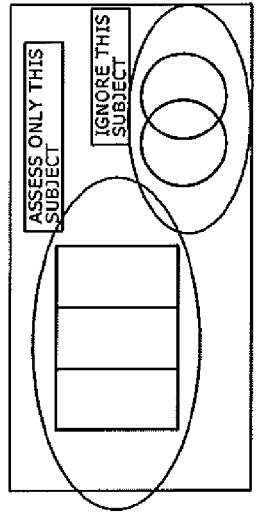
Figure 22A:
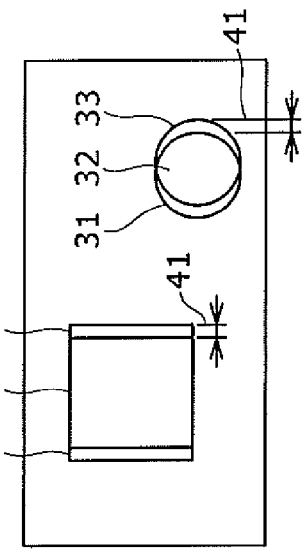

FIG. 22A illustrates the display on a three-dimensional monitor before modification.

The images shown in FIG. 22A look as shown in FIG. 22D when displayed on a two-dimensional monitor. Two subjects, a rectangle and a circle, appear. The left and right images 31 and 33 are shown on the three-dimensional monitor with parallax between the two images.

Figure 22B:
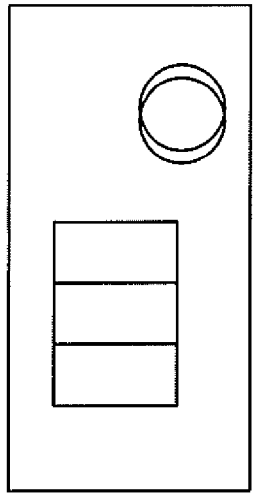

FIG. 22B illustrates the display on a three-dimensional monitor when an attempt is made to make only the subject shown as a rectangle in FIG. 22A look far away thanks to the depth effect. If a modification is made as in this case to increase the parallax, the user watching the three-dimensional monitor can perceive the subject as being located in the back. The question here is to know the extent to which the parallax should be increased to produce an intended sense of depth.

FIG. 22E illustrates the approach used in the past.

In the past, the data of the subject which should look far away is modified so that the subject appears as shown in FIG. 22E, after which the display is verified. The data is modified every time, followed by the verification of the display, thus resulting in a time-consuming task.

Figure 22C:
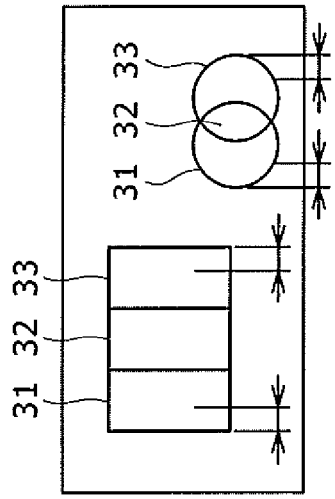

FIG. 22C illustrates the approach used in the present example.

The parallax of all the subjects is increased using the functionality shown in the present example. Then, the depth effect is verified by focusing attention only on the rectangular subject to be modified and ignoring the circular subject as illustrated in FIG. 22F. After the magnitude of parallax is determined, the subject data is modified. As described above, the user can actually perceive the depth effect through simple steps before modifying the subject data properly, thus making it possible to complete the task of modifying the parallax quickly.

The signal processor 10 according to the present embodiment described above controls the phases of the left and right images supplied from the two cameras 1L and 1R, thus creating parallax between the left and right images displayed on the display section 8 and allowing for simulation of the three-dimensional effect. This makes it possible for the user to readily verify the change in the images resulting from the change in parallax by manipulating the operation section 9. At this time, it is easy to tell the extent to which the parallax distance should be changed to produce the intended effect, possibly contributing to significantly reduced shooting time during content creation.

Further, it is possible to display the three- and two-dimensionally displayed areas using different images. For example, displaying the two-dimensionally displayed areas in black prevents these areas from mixing with the area in which the left or right image is three-dimensionally displayed, thus making it easier for the user to verify the three-dimensionally displayed area. Further, it is possible to make only the image to be verified by the user stand out by changing the color of the two-dimensionally displayed areas to suit the color (e.g., black, white, gray) of the bezel of the display section 8.

Further, if the subject image light entering the camera 1L and that entering the camera 1R are not flipped relative to each other, the left and right images are masked based on the masking timing generated according to whether the phase is leading or lagging. This makes it possible to mask the areas where no image signal is included in the display region of the display section 8 irrespective of whether the input image signal is leading or lagging.

On the other hand, if the subject image light entering the camera 1L and that entering the camera 1R are flipped relative to each other, the masking timing of the image signal that is flipped and input is flipped to produce a masking timing of a normally input image signal. Next, the logical sum of the masking timings of the left and right images is taken. Then, the areas to be masked in the left and right images are determined based on these masking timings, thus setting the masked areas correctly and displaying a three-dimensional image on the display section 8.

Further, if a parallax value is added to the screen display on the monitor, information is shown on the screen to indicate that "parallax is simulated." If there is parallax meta data for the image data displayed on the screen, this meta data is displayed. In addition, the parallax value given for simulation is also displayed on the screen. This makes it easier to perceive the change in parallax resulting from the movement of the left and right images, thus allowing for proper application of parallax.

Still further, the left and right images captured with a given parallax therebetween can be experimentally shown through an easy process to verify the effect after the change so as to adjust the parallax as a post-process. At this time, either of the left and right images may be moved horizontally with the other image remaining unmoved. Alternatively, both of the images may be moved horizontally in the opposite directions. Still alternatively, more or less parallax may be applied to a particular subject than during shooting, and this may be done actively rather than for the purpose of adjustment.

Still alternatively, the signal processor 10 may be supplied with a recording medium in which the program code of software implementing the functionality of the above embodiment is recorded. On the other hand, it is needless to say that the functionality is also implemented by causing the signal processor 10 to read the program code from the recording medium and execute the code.

Among recording media adapted to supply the program code in this case are flexible disk, hard disk, optical disk, magneto-optical disk, CD-ROM, CD-R, magnetic tape, non-volatile memory card and ROM.

Still alternatively, the functionality of the above embodiment is implemented by executing the program code read by the signal processor 10. In addition, part or whole of the actual process is handled by the operating system or other program operating on the signal processor 10 based on the instructions of the program code. The case is also included in which the functionality of the above embodiment is implemented by that process.

On the other hand, the present disclosure is not limited to the above embodiment. It is a matter of course that various application and modification examples may be used without departing from the scope of the present disclosure.

What is claimed is:

1. A signal processing device comprising: a phase matching section adapted to bring two image signals supplied from two cameras arranged according to the distance between the left and right human eyes and adapted to image the same subject into phase, one image signal being a left image signal stored in a left image memory, the other image signal being a right image signal stored in a right image memory; a phase adjustment section adapted to change the horizontal phase of the left and/or right image signal based on a phase displacement specified by an operation section so as to move both or either of the left and right images displayed on a display section by the left and right image signals horizontally by a predetermined distance and output the left and right image signals with changed parallax between the left and right images; and a read section adapted to output the left and/or right image signal in which, of those areas displayed on the display section three-dimensionally due to the overlap of the left and right images with changed parallax and other areas where only the left or right image is displayed on the display section two-dimensionally, the image in the two-dimensionally displayed areas has been replaced by an image different from that in the three-dimensionally displayed areas, wherein the read section replaces, by other image signal, the area not including the left or right image signal on the screen of the display section due to leading or lagging phase of the left or right image signal to be supplied and outputs the resultant signal.

2. A signal processing device of claim 1, wherein if the subject image light entering one of the cameras and that entering the other camera are flipped relative to each other, the read section flips the output of the flipped and input left or right image signal, replaces, by other image signal, the area not including the left or right image signal, and outputs the resultant signal.

3. A signal processing device of claim 1, wherein the read section comprises: a timing generation unit adapted to output, based on a predetermined timing, an instruction to replace the image in the two-dimensionally displayed areas with a different image; and a selection section adapted to select the left or right image signal supplied from the phase adjustment section or a masking signal for replacing the image with a different image based on the instruction.

4. A signal processing device of claim 3, wherein the timing generation unit comprises: a first storage block adapted to store a first masking timing used to mask the normally input left or right image signal according to the subject image light; a second storage block adapted to store a second masking timing used to mask the flipped and input left and/or right image signal according to the flipped subject image light; and an address control block adapted to supply write and read addresses for the first masking timing to the first storage block and write and read addresses for the second masking timing to the second storage block, each storage block being selected according to the normal or flipped output of the input left and/or right image signal; the first or second masking timing being read from the first or second storage block selected according to the normal or flipped output.

5. A signal processing device of claim 4, wherein the address control block changes the write and read addresses to be supplied to the first or second storage block according to the change in phase of the left or right image signal if normal output is used as a reference.

6. A signal processing device of claim 1, wherein the phase adjustment section controls the display of the phase displacement specified by the operation section or meta data supplied from the cameras on the display section.

7. A signal processing device of claim 1, wherein the display section is a three-dimensional monitor adapted to three-dimensionally display the subject based on the left and right image signals read respectively from the left and right image memories, and the image displayed in the two-dimensionally displayed area is in the same color as the bezel of the three-dimensional monitor.

8. A signal processing method comprising: bringing two image signals supplied from two cameras arranged according to the distance between the left and right human eyes and adapted to image the same subject into phase one image signal being a left image signal stored in a left image memory, the other image signal being a right image signal stored in a right image memory; changing the horizontal phase of the left and/or right image signal based on a phase displacement specified by an operation section so as to move both or either of the left and right images displayed on a display section by the left and right image signals horizontally by a predetermined distance and output the left and right image signals with changed parallax between the left and right images; and outputting the left and/or right image signal in which, of those areas displayed on the display section three-dimensionally due to the overlap of the left and right images with changed parallax and other areas where only the left or right image is displayed on the display section two-dimensionally, the image in the two-dimensionally displayed areas has been replaced by an image different from that in the three-dimensionally displayed areas; wherein the outputting replaces, by other image signal, the area not including the left or right image signal on the screen of the display section due to leading or lagging phase of the left or right image signal to be supplied and outputs the resultant signal.

9. A display device comprising: a phase matching section adapted to bring two image signals supplied from two cameras arranged according to the distance between the left and right human eyes and adapted to image the same subject into phase, one image signal being a left image signal stored in a left image memory, the other image signal being a right image signal stored in a right image memory; a display section adapted to display left and right images by the left and right image signals; a phase adjustment section adapted to change the horizontal phase of the left and/or right image signal based on a phase displacement specified by an operation section so as to move both or either of the left and right images horizontally by a predetermined distance and output the left and right image signals with changed parallax between the left and right images; and a read section adapted to output the left and/or right image signal in which, of those areas displayed on the display section three-dimensionally due to the overlap of the left and right images with changed parallax and other areas where only the left or right image is displayed on the display section two-dimensionally, the image in the two-dimensionally displayed areas has been replaced by an image different from that in the three-dimensionally displayed areas; wherein the read section replaces, by other image signal, the area not including the left or right image signal on the screen of the display section due to leading or lagging phase of the left or right image signal to be supplied and outputs the resultant signal.

10. A non-transitory computer readable medium having stored thereon a program causing a computer to:
bring two image signals supplied from two cameras arranged according to the distance between the left and right human eyes and adapted to image the same subject into phase, one image signal being a left image signal stored in a left image memory, the other image signal being a right image signal stored in a right image memory; change the horizontal phase of the left and/or right image signal based on a phase displacement specified by an operation section so as to move both or either of the left and right images displayed on a display section by the left and right image signals horizontally by a predetermined distance and output the left and right image signals with changed parallax between the left and right images; and output the left and/or right image signal in which, of those areas displayed on the display section three-dimensionally due to the overlap of the left and right images with changed parallax and other areas where only the left or right image is displayed on the display section two-dimensionally, the image in the two-dimensionally displayed areas has been replaced by an image different from that in the three-dimensionally displayed areas; wherein the output replaces, by other image signal, the area not including the left or right image signal on the screen of the display section due to leading or lagging phase of the left or right image signal to be supplied and outputs the resultant signal.

* * * * *